US008500293B2

(12) United States Patent
Sutton et al.

(10) Patent No.: US 8,500,293 B2
(45) Date of Patent: Aug. 6, 2013

(54) PERSONAL VIDEO LIGHTING SYSTEM

(76) Inventors: Joan E. Sutton, Medway, MA (US); Jeffrey K. Sutton, Pembroke Pines, FL (US); Heather E. Sutton, Santa Monica, CA (US)

(*) Notice: Subject to any disclaimer, the term of this patent is extended or adjusted under 35 U.S.C. 154(b) by 0 days.

(21) Appl. No.: 13/425,390

(22) Filed: Mar. 20, 2012

(65) Prior Publication Data
US 2012/0243200 A1 Sep. 27, 2012

Related U.S. Application Data

(60) Provisional application No. 61/465,545, filed on Mar. 21, 2011, provisional application No. 61/518,475, filed on May 7, 2011.

(51) Int. Cl.
*A47B 23/06* (2006.01)
*F21V 1/10* (2006.01)

(52) U.S. Cl.
USPC ........... 362/137; 362/253; 307/150; 320/107; 320/137

(58) Field of Classification Search
USPC ................. 362/127, 187, 153, 130, 131, 133, 362/134, 253; 307/104, 149–150; 320/107, 320/108, 137
See application file for complete search history.

(56) References Cited

U.S. PATENT DOCUMENTS

| 6,305,818 | B1 | 10/2001 | Lebens |
| 7,604,361 | B2 | 10/2009 | Pohlert |
| 7,652,716 | B2 | 1/2010 | Qiu |
| 7,863,829 | B2 | 1/2011 | Sayers |
| 2009/0251560 | A1 | 10/2009 | Azar |
| 2010/0124062 | A1 | 5/2010 | Cercone |

*Primary Examiner* — Joseph L Williams
(74) *Attorney, Agent, or Firm* — Jeffrey K. Sutton

(57) ABSTRACT

A personal video lighting system to provide enhanced facial illumination for use with a personal computer and video communication.

20 Claims, 24 Drawing Sheets

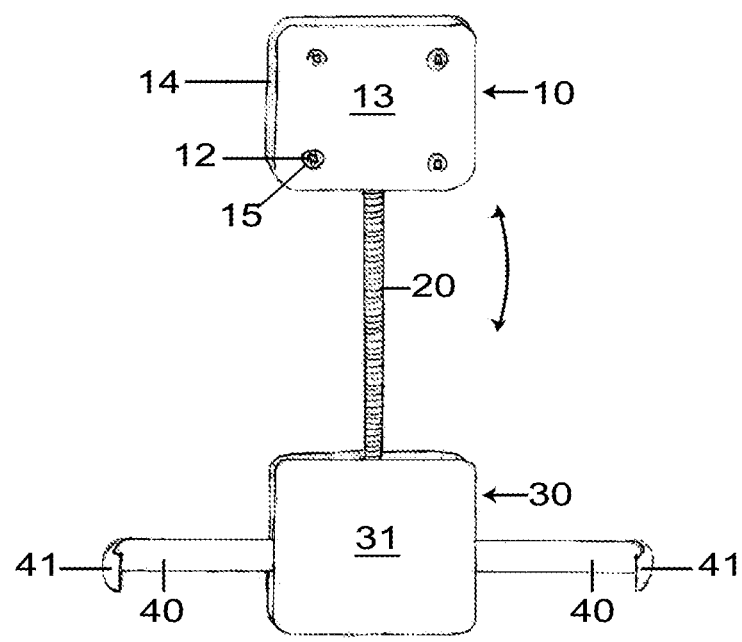
FIG. 1
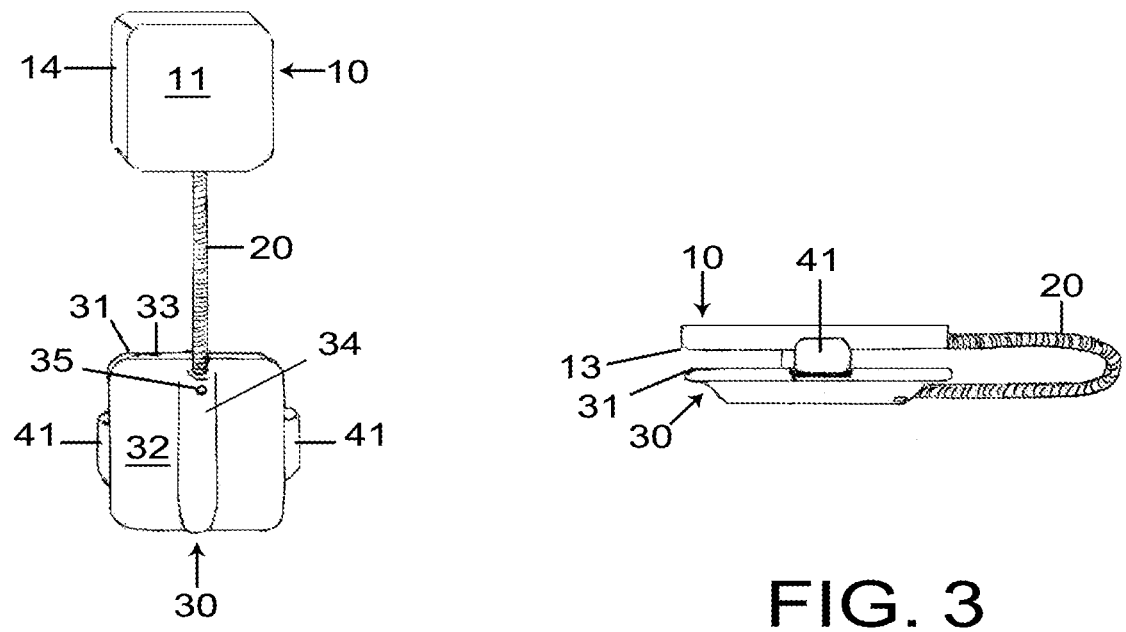
FIG. 2
FIG. 3

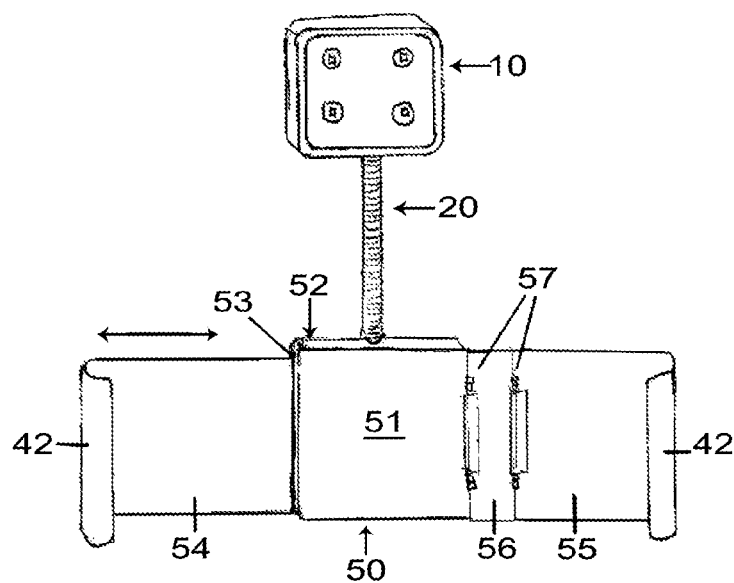
FIG. 6
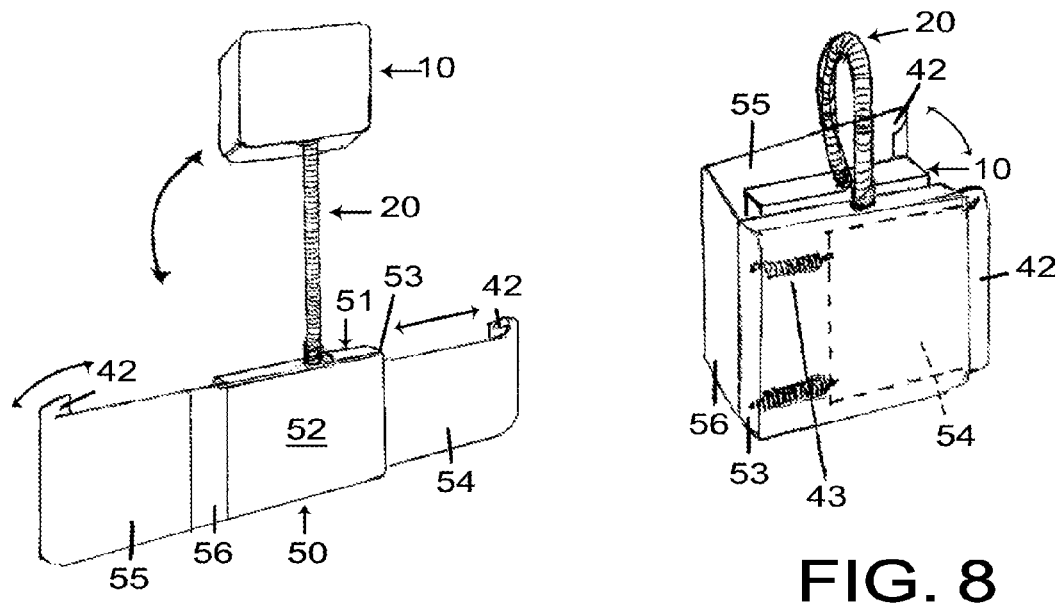
FIG. 7
FIG. 8

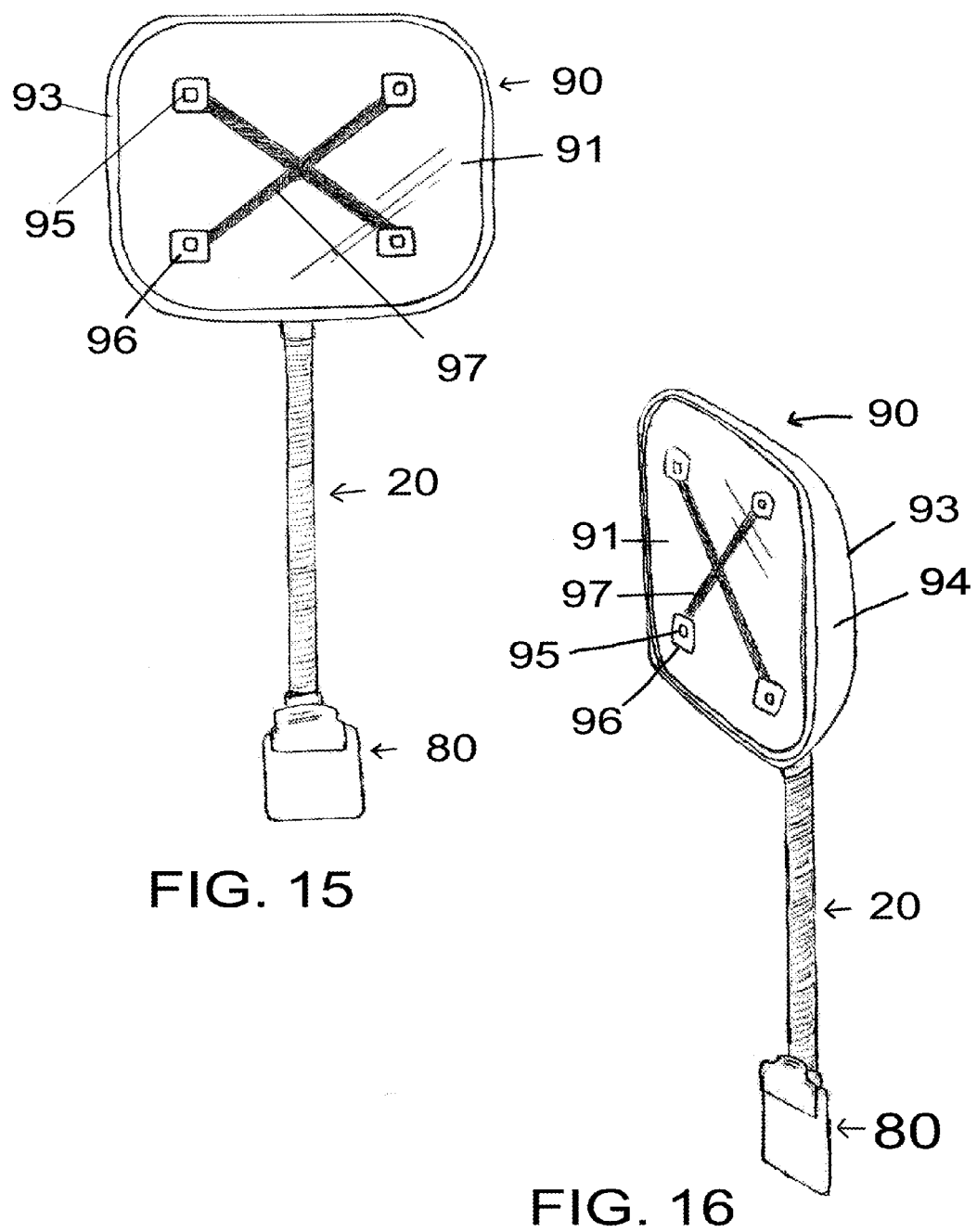

PERSONAL VIDEO LIGHTING SYSTEM

RELATED APPLICATIONS

This application claims benefit of provisional application 61/465,545 filed on Mar. 21, 2011 and provisional application 61/518,475 filed on May 7, 2011.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention relates to personal video lighting systems. In particular, the present invention relates to a lighting system comprised of two or more white light emitting diodes spaced some distance apart to reduce or eliminate facial shadows and improve the appearance of the user while communicating by video on a personal computing device.

BACKGROUND OF THE INVENTION

The use of personal computers and hand-held computing devices for video communication has dramatically increased in recent years. This increase in video communication has been enabled in part by increased computing power and reduced computing cost, and has also been fueled by increased demand from use of social computing networks. Many laptop computers are now supplied with a built in camera to enable the use of video communication by the user.

One major use of video communication is for internet dating, where the users can see and interact with a potential partner from the relative safety and comfort of their own home before deciding to personally meet and interact with the other person. In the context of video dating, most people wish to look their best in order to appear as attractive as possible to the potential partner, and proper lighting plays an important role in the appearance.

Another increased use of video communication is for business meetings and video conference calls. The increased use of video for business use has been in part driven by negative global economic conditions and cost-cutting measures that have impacted travel budgets. The use of video conferencing provides an economic alternative to geographic travel. In order to make a positive impression on the viewer, such as during interactions with customers, supervisors, investors, etc., most people pay great attention to personal grooming and appearance, and are increasingly aware of how they appear in video.

In addition to the increased use of video communication for conference calls, journalists and film-makers are more commonly using video capture from personal computers for "vlogs" and "webisodes", since the internet now provides instant widespread access to these communities. Image and appearance are also of particular importance within the industries of journalism and film.

Recent improvements in LED lighting technology have produced white LED light sources comprised of a blue emitting LED with an additional phosphor that produces a spectral output very close to the ideal CIE 1931 color coordinates of $x=0.33$ and $y=0.33$ for white light, as well as reducing the overall cost per lumen to the point of being affordable for consumer applications. These single-chip white LED's are more economical for consumer based products than a combination of individual red, green, and blue LED's used in a $R:G:B=3:7:1$ ratio to produce white light.

Because personal computers are used in close proximity to the user, the typical light sources that are either built in to the computer or camera, or as an added accessory, typically either do not illuminate the face completely and tend to create harsh shadows around the eye sockets and edges of the face of the user, or overilluminate the user and "wash out" the facial features. They also do not have adequate dimming capabilities for use with webcams and personal computers. Many LED white light sources tend to have a blue coloration to them from the primary blue LED source and poor phosphor matching, and do not closely match the CIE spectral coordinates of $x=0.33$ and $y=0.33$ for white light.

Light sources contained within a small area, such as a single point source or within a 2 inch area, do not provide suitable illumination to the face of a computer user sitting within 2-3 feet of the light source, even if multiple lighting elements are employed such as a multi-element LED flashlight. These types of light sources tend to over-illuminate the face of the subject and "wash out" the facial features, as well as create unflattering harsh shadows on the edges of the subject's face.

In contrast, contemporary glamour-style lighting for professional photography consists of a single source of light having a suitably sized illumination area being positioned slightly above and in front of the head of the subject at a suitable distance, thereby providing full illumination of the subject's face while casting slight shadows downward from the chin to create a more flattering contour around the cheekbones and neckline.

The following art has dealt with the field of LED lighting systems in general.

U.S. Pat. No. 6,305,818 issued to Lebens on Oct. 23, 2001 discloses a method and apparatus for LED illumination.

U.S. Pat. No. 6,848,802 issued to Chen on Feb. 1, 2005 discloses a computer light with an extensible electrically conductive wire.

U.S. Pat. No. 7,759,881 issued to Melanson on Jul. 20, 2010 discloses an LED lighting system with multiple mode current control dimming strategy.

U.S. Pat. No. 7,652,716 issued to Qiu on Jan. 26, 2010 discloses a computer-controlled lighting for video communication.

U.S. Patent Application 2009/0251560 by Azar discloses a video light system and method for improving facial recognition using a video camera.

U.S. Patent Application 2010/0124062 by Cercone discloses a video conference lighting fixture.

SUMMARY OF THE INVENTION

The present invention relates to lighting systems, particularly LED lighting systems, used for video communication with personal computing devices. The present invention provides for a personal video lighting system that enhances the facial appearance of a computer user when captured by a camera and used for video communication. The present invention provides for improvements over prior art lighting systems by providing balanced illumination of the face of the user in a compact, portable, and economic LED lighting system.

BRIEF DESCRIPTION OF THE DRAWINGS

FIG. 1 is a front view of an embodiment of a personal video lighting system constructed in accordance with the principles of the invention.

FIG. 2 is a rear view of the personal video lighting system shown in FIG. 1, depicting the slideable arms in the retracted position.

FIG. 3 is a side view depicting the personal video lighting system shown in FIGS. 1 and 2 in a collapsed state for storage and transport.

FIG. 6 is a front view of an embodiment of a personal video lighting system having hinged arms for storage and transport.

FIG. 7 is a rear perspective view of the personal video lighting system shown in FIG. 6, depicting the movements of the retractable arms and LED support structure.

FIG. 8 is a perspective view of the personal video lighting system shown in FIGS. 6 and 7, depicting the personal video lighting system in a collapsed state for storage and transport.

FIG. 15 is a front view of an embodiment of a personal video lighting system having adjustable LED's.

FIG. 16 is a side perspective view of the personal video lighting system shown in FIG. 15.

FIGURES

Detailed Description

Figure 4:
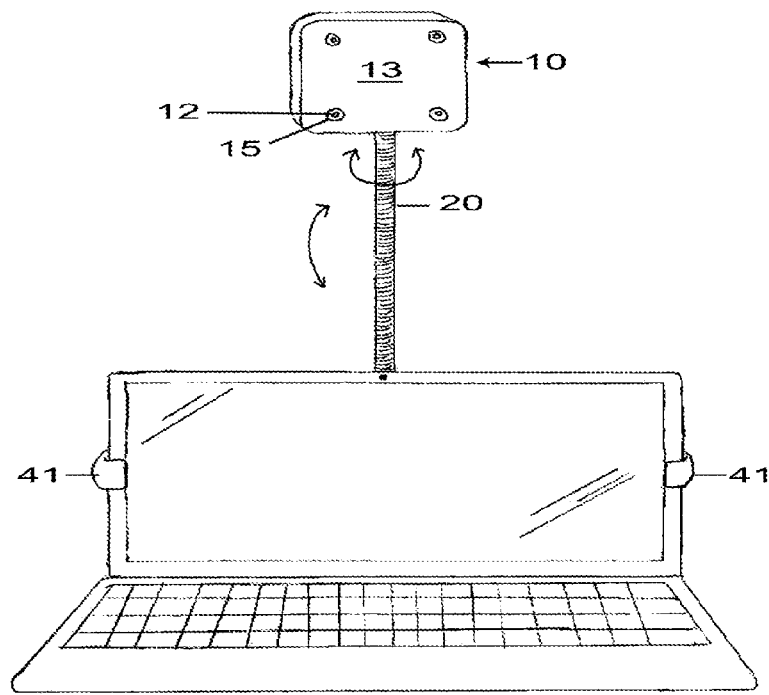
FIG. 4 is a front view of a personal computer having attached to it a personal video lighting system constructed in accordance with the principles of the invention.

The present invention relates to personal video lighting systems for enhancing the facial appearance of the user while communicating by video on a personal computing device. In the context of the present invention, the terms "personal computer" and "personal computing device" shall be understood to be interchangeable and further to mean a laptop computer, a desktop computer, a notepad computer, a notebook computer, a tablet computer, a personal digital assistant (PDA), a cellular telephone, a "smart-phone", or any other computing device that contains a digital camera, or when connected to a digital camera, is capable of digitally capturing and transmitting video data. It shall be understood that the term "personal computer" as used herein shall mean any of the above mentioned devices.

The term "proper facial illumination" refers to the illumination of the face of a computer user by light other than ambient room light and/or light from the computer display itself while using the computer for video communication, and refers to the level of brightness of the light, the spatial distribution of the light over the users face, and the color balance of the rendered image captured by the camera. In preferred embodiments the quality of light produced by the present invention provides for complete illumination of the user's face without washing out facial features and has CIE color chromaticity coordinates of x=about 0.300 to about 0.420 and y=about 0.300 to about 0.420, and more preferably from about of x=about 0.330 to about 0.395 and y=about 0.330 to about 0.395. The term "light-emitting diode" or "LED" refers to a particular class of semiconductor devices that emit visible light when an electric current passes through them, and includes both traditional low power versions (e.g. operating at about 20 mW), medium power version (e.g. operating from 20 mW to about 3 W) and also high power versions (e.g. operating from 3 W to about 5 W). There are many different chemical compositions and materials that can be used to fabricate LED's, including aluminum indium gallium (AlInGa), indium gallium nitride (InGaN) for example. InGaN is commonly used to fabricate blue light emitting LED's that have a phosphor coating to create white light emitting LED's. The terms "LED", "LED light", and "LED lamp" shall be understood to be interchangeable and mean any of the aforementioned subclass of light emitting semiconductor devices. It should be understood that these foregoing LED material compositions are mentioned not by way of limitation, but merely as examples.

Because LED's are current driven devices, attempts to adjust the brightness by varying the voltage have limited success and application. Many currently available LED lights have a resistor-based dimming function that provides limited levels of brightness. The current draw of a resistor or potentiometer used to adjust the voltage will also create heat and waste current form the power source, which is especially problematic for battery operated devices. Typical means of providing a current limiting power to LED's is to use pulse width modulation (PWM), also known as pulse duration modulation (PDM) or pulse frequency modulation (PFM), to adjust the light output. Several manufacturers make suitable integrated circuit chips of various designs and configurations. These circuits typically operate at a frequency high enough to be imperceptible to human vision, such as for example 100 kHz. Examples of such PWM circuits include Texas Instruments (Texas Instruments, Dallas, Tex. 75265) TLC5916 and TLC5917 chips, which can be pulsed with a Texas Instruments TLC555 clock chip. Other known suitable LED driver chips include for example Zetex ZXLD13XX series and ZXSC3XX series (Zetex, Inc., Hauppauge, N.Y. 11788). The light output of LED's driven by these chips can be easily controlled through a potentiometer incorporated into the circuit, or by an external DC voltage applied to the circuit. It should be understood that these foregoing PWM driver chip examples are mentioned not by way of limitation, but merely as examples of PWM circuits that could be used in the invention.

Because USB power output is limited to 500 mA current output per port by present standards the use of devices consuming more power require an additional power source, such as one or more batteries. To provide proper illumination, that is sufficient illumination and optimal spatial distribution of the light, to a computer user for video communication via a webcam and the like, two or more LED's are needed and may consume more power than the USB port is capable of providing. It may be desirable to utilize a second USB port to provide the necessary power for the illumination. Requiring a second available USB port may be cumbersome for some users, and an alternative solution is to provide a battery pack to supply the necessary power. In some embodiments of the present invention, the battery pack can be comprised of one or more rechargeable batteries which are connected through a suitable circuit to a USB port to provide recharging of the batteries when not in use. In some embodiments of the present invention the two or more LED's require 500 mA or less of current and are powered directly from a single USB port. In some embodiments, the two or more LED's are powered solely by one or more batteries. Due to variations in battery power, ambient lighting conditions, LED performance and placement, and user conditions and preference, preferred embodiments of the lighting systems of the present invention require a dimming function to provide the necessary proper facial illumination.

While a personal video lighting system of the present invention can be of varied shapes and sizes, several preferred embodiments of the present invention are described in the following figures and text, which are provided for illustrative purposes only and shall not be construed to limit the scope of the invention.

FIG. 1 is a front view of an embodiment of a personal video lighting system of the present invention wherein a light panel 10 is connected to a body 30 by a flexible support arm 20. In a preferred embodiment the flexible support arm 20 is hollow and made by winding and interlocking flat wire to create a tubular structure, also commonly known as "gooseneck" tubing. The flexible support arm 20 may also be constructed of other types of materials and designs, such as a hollow tubular telescopic arm, a hinged arm, a plastic coated bendable wire, and other flexible materials and designs commonly known in the art. In some embodiments the flexible support arm 20 is hollow, thereby providing for the passage of wires from the light panel 10 to the body 30 within the arm. In some embodiments the flexible support arm 20 is solid and the passage of wires is made outside the arm. The range of motion of the flexible support arm 20 is from about 0 degrees to about 320 degrees, preferably from about 0 to about 180 degrees, and allows the light panel 10 to be adjusted as indicated by the arrow to adjust the angle of incidence of the light upon the user. In some embodiments the range of motion of the flexible support arm 20 allows the lighting system to fold up so that the light panel 10 can be folded over to place front surface 13 in proximity to the front surface 31 of the body 30, providing for compact storage and protection of the light panel front surface 13.

Still referring to FIG. 1, the body 30 further includes a pair of opposing slideable arms 40, wherein each arm has an inner end (not shown) contained within the body 30, and an outer end 41 having a curved hook shape adapted to grip the outer surface of a computer display screen. The pair of opposing slideable arms 40 are attached to each other at the inner ends within the body 30 by a tension means, such as one or more extension springs, elastic bands, or a threaded fastening screw, such that when the outer ends 41 with the curved hooks are placed around a computer display, the tension means holds the lighting system in place on the back of the computer display.

Still referring to FIG. 1, the light panel 10 has a front surface 13, and a rear surface (not shown), and a space 14 defined between said front and rear surfaces. In some embodiments the front surface 13 is attached to the rear surface by means of one or more mechanical fasteners, such as screws. In some embodiments the front surface 13 is attached to the rear surface by means of molded interlocking snap fit barbs, as is commonly known in the art of plastic injection molding and assembly. The front surface 13 contains two or more receptacles 15, wherein each receptacle 15 contains one or more LED's 12. In a preferred embodiment the receptacles 15 are spaced at least 2 inches apart to provide spatial illumination to the face of the subject. In some embodiments each LED 12 is mounted on a printed circuit board contained in the light panel 10 and operatively connected by wires to a means of power. In a preferred embodiment the LED's 12 are connected by wires that pass through the lumen of the hollow flexible support arm 20 and are connected to a means of power and a controller contained within the body 30. In an alternate embodiment the wires are connected to a means of power and a controller contained within the light panel 10. In some embodiments the wires are connected to a USB port (not shown) to provide a means of power for recharging one or more batteries contained within the light panel 10 or within the body 30.

FIG. 2 is a rear view of the personal video lighting system of FIG. 1 having a light panel 10 connected to a body 30 by a flexible support arm 20. The body 30 is comprised of a front surface 31, a rear surface 32, and a space 33 defined between said front and rear surfaces. The space 33 contains a guide slot (not shown) adapted for engaging the pair of opposing slideable arms 40 with outer ends 41. The light panel 10 is comprised of a front surface 13, a rear surface 11, and a space 14 defined between said front and rear surfaces. The front surface 13 contains two or more receptacles 15 having one or more LED's 12. The body 30 may also be adapted for containing one or more batteries (not shown) and further contains a power switch 35 to turn the personal video lighting system on and off. In some embodiments the power switch also contains a potentiometer function to adjust the output of the light. In preferred embodiments the potentiometer controls a pulse width modulating circuit to adjust the intensity of the light. The pulse width modulating circuit can be contained within the body 30, or within the space 14 of the light panel 10.

FIG. 3 is a side view depicting the personal video lighting system of FIGS. 1 and 2 in the folded state for transport and storage. The light panel 10 is placed in the folded position by bending the light panel 10 about the flexible support arm 20, moving it towards the front surface 31 of the body 30 such that the front surface 13 of the light panel is brought into proximity to or contact with the front surface 31 of the body 30. The opposing slideable arms retract inside the body 30, and the outer ends 41 with curved hooks secure the light panel 10 into the folded position.

FIG. 4 is a front view depicting a laptop computer having the personal video lighting system as described in FIGS. 1-3 attached to the display screen. The light panel 10 may be moved about by adjusting flexible support arm 20 as indicated by the arrows to modify the angle of incidence of the front surface 13 having LED's 12 contained within receptacles 15, thereby adjusting the light to suit the user's needs. In some embodiments, the outer ends 41 with curved hooks may also contain a friction enhancing material on the interior surface to secure the clamp, such as for example a rubber strip or coating.

Figures 5A, 5B:
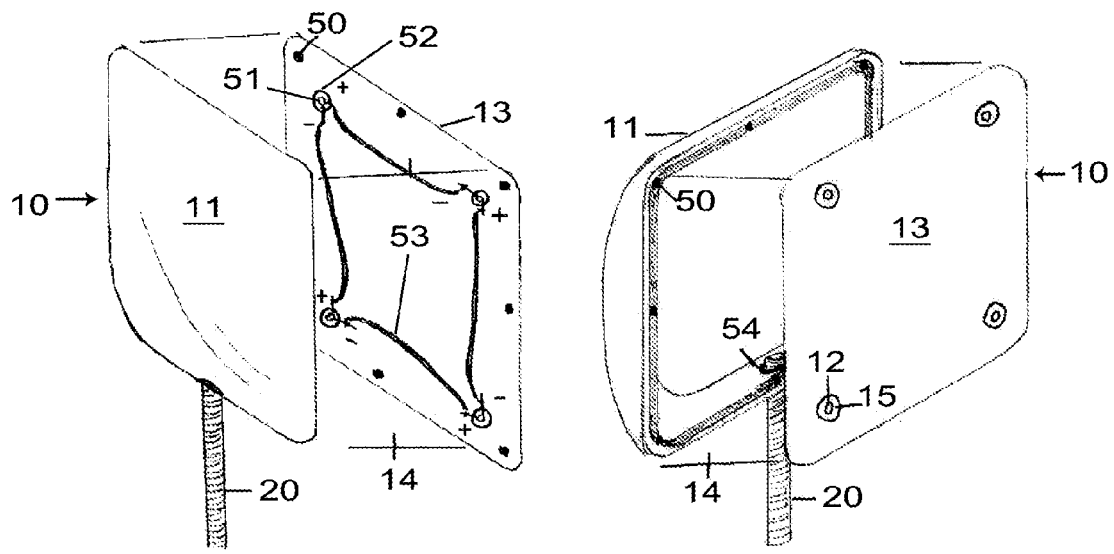
FIG. 5A is an exploded perspective view of the light panel portion of a personal video lighting system, showing some of the internal aspects of the LED connections.
FIG. 5B is an exploded perspective view of the light panel portion of a personal video lighting system, showing some of the details of the construction.

FIG. 5A is an exploded rear perspective view of the light panel 10 of FIGS. 1-4, wherein the light panel 10 is connected to a flexible support arm 20, and further showing some of the details of the space 14 defined by the front surface 13 and the rear surface 11. The space 14 contains the cathode 51 and anode 52 leads of the LED's, which are operatively connected by wires 53 to each other and to the system power switch and power supply (not shown). In preferred embodiments the LED's are connected in series to reduce any variations of light output and function by individual LED's. In some embodiments the LED's are connected in parallel to reduce the operating voltage needed to power the LED's. The front surface 13 can be connected to the rear surface 11 by means of molded interlocking snap fit barbs 50, such as are commonly known in the art of plastic injection molding and assembly. In some embodiments the front surface 13 can be connected to the rear surface 11 by means of an adhesive, or by one or more screws. FIG. 5B depicts an exploded front perspective view of the light panel 10 and further showing the details of the space 14 that is defined by the front surface 13 and the rear surface 11. The rear surface 11 is connected to a flexible support arm 20 by means of a threaded hole 54 in the rear surface 11, which mates with a threaded adapter or threaded end of the flexible support arm 20. The rear surface 11 of the light panel 10 can be connected by means of molded interlocking snap fit barbs 50 to the front surface 13. The front surface 13 contains two or more receptacles 15 each having one or more LED's 12. FIG. 6 is a front view depicting another embodiment of a personal video lighting system having a light panel 10 connected to a body 50 by a flexible support arm 20. The body 50 is comprised of a front surface 51, a rear surface 52, and a space 53 defined between said front and rear surfaces, wherein the front surface is attached to the rear surface by means of screws, adhesive, or molded interlocking snap fit barbs (not shown). A slideable arm 54 is slideably attached to the body 50, as indicated by the arrow, wherein the body 50 is adapted to receive the slideable arm 54. An intermediate section 56 is hingedly connected to body 50 and opposing arm 55 by hinges 57. Each arm 54, 55 has an outer end 42 having a curved hook shape adapted to grip and connect to the outer surface of a computer display screen. The end of slideable arm 54 is connected to the body 50 by a tension means, such as one or more extension springs or elastic bands that are contained within the body 50, such that the outer ends of the arms 54, 55 with the curved hooks 42 can be placed around the opposing sides a computer display, wherein the tension means holds the lighting system in place on the back of the computer display. The curved hooks 42 may further contain a friction enhancing feature or surface (not shown), such as a rubber or polymer pad or coating to prevent or reduce slippage of the surface when in contact with the computer display.

FIG. 7 is a rear perspective view depicting the personal video lighting system shown in FIG. 6, and shows the relative movements of the light panel 10, slideable arm 54, and opposing arm 55, as shown by the arrows. The light panel 10 is first folded towards the body 50 by bending it about the flexible support arm 20 until the light panel 10 is in close proximity to or contact with the body 50. Secondly, the arms 55, 56 are rotated about the hinges such that the opposing arm 55 covers the light panel 10. A fastening means (not shown) such as a barb, a hasp, or a hook and loop fastener may also be disposed about the end of the opposing arm 55 and the body 50 to secure the opposing arm 55 to the body 50 for storage and transport.

FIG. 8 is a front perspective view depicting the personal video lighting system shown in FIGS. 6 and 7 in the compact, folded state, showing the tension means 43 depicted as a pair of extension springs in hidden partial view within the body 50. The flexible support arm 20 is useful as a carrying handle for the LED lighting system, and the outer surfaces of the arms 54, 55, 56 form a protective case for the LED lighting system secured for storage and transport. In some embodiments a battery power source and power switch (not shown) may be contained in the light panel 10, or may be contained within the space 53 of the body 50, and further may be accessible by a hatch, door, or other covering (not shown). In some embodiments the battery power is recharged by direct connection to a USB port by a wire (not shown). The personal video lighting system may be controlled by a power switch (not shown) mounted and contained within either the light panel 10 or the body 50, and accessible by protrusion of the switch handle through any of the surfaces of the light panel 10 or body 50. The power switch may also have a means for a dimmer function, such as provided by a potentiometer connected to a pulse width modulation circuit, to control the light output.

Figure 9:
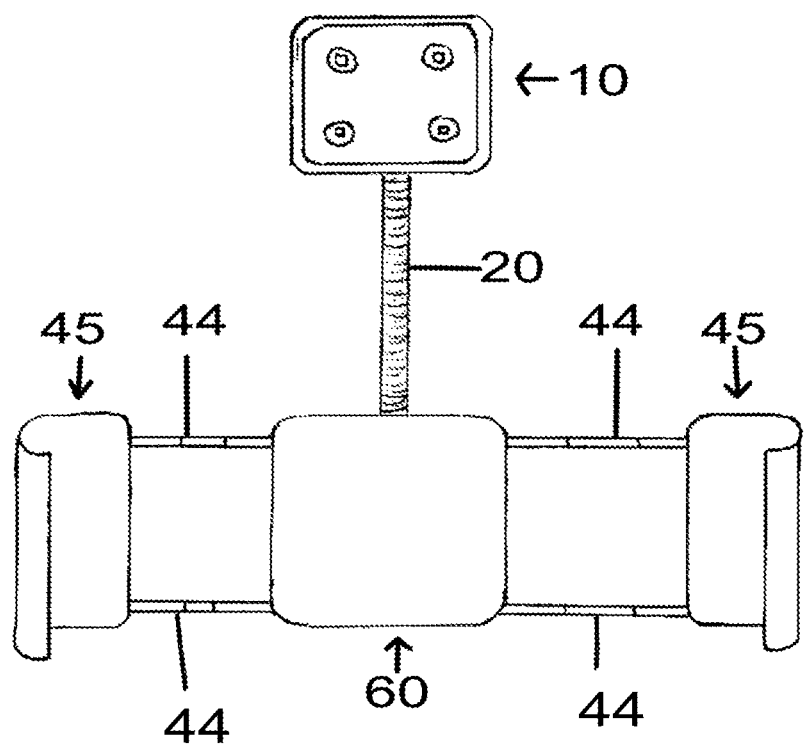
FIG. 9 is a front view of a personal video lighting system having telescoping arms.

FIG. 9 is a front perspective view depicting an alternate embodiment of a personal video lighting system having a light panel 10 connected to a body 60 by a flexible support arm 20. The body 60 is further comprised of a pair of opposing curved panels 45 that are connected by extendable arms 44 to the body 60. In a preferred embodiment the extendable arms 44 are telescopic and hollow, and further contain tension means, such as extension springs or elastic bands (not shown) connected at one end to the curved panels 45 and at the other end to the body 60, such that the curved panels 45 are always maintained in tension.

Figure 10:
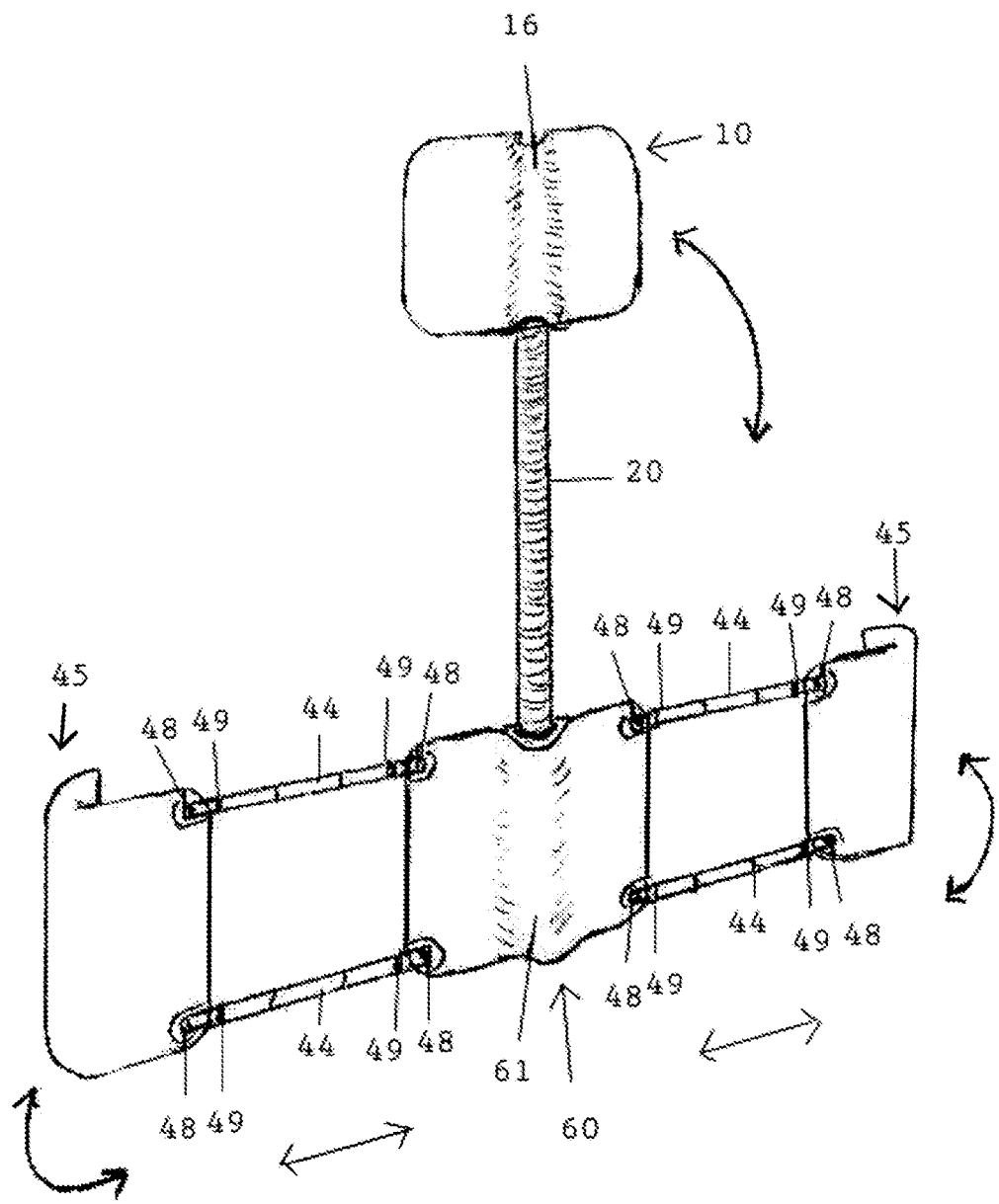
FIG. 10 is a rear perspective view of the personal video lighting system shown in FIG. 9.

FIG. 10 is a rear perspective view of FIG. 9. The light panel 10 has a concave area 16 that mates with the convex area 61 of the body 60, providing for storage in a nested position when moved about flexible support arm 20. In some embodiments the convex area 61 contains the power source (not shown), such as batteries. In some embodiments the extendable arms 44 are fastened to the curved panels 45 and body 60 by means of a screw 48 adjacent to the hinge 49. The extendable arms 44 can collapse or extend to adapt to different sized computer display monitors, and the hinges allow motion to fold backward and cover the light panel in a compact position for storage. In some embodiments, the extendable arms 44 are hollow and contain a tension means, such as an extension spring or an elastic band connected to hinges 49, such that the extendable arms 44 are maintained in tension.

Figure 11:
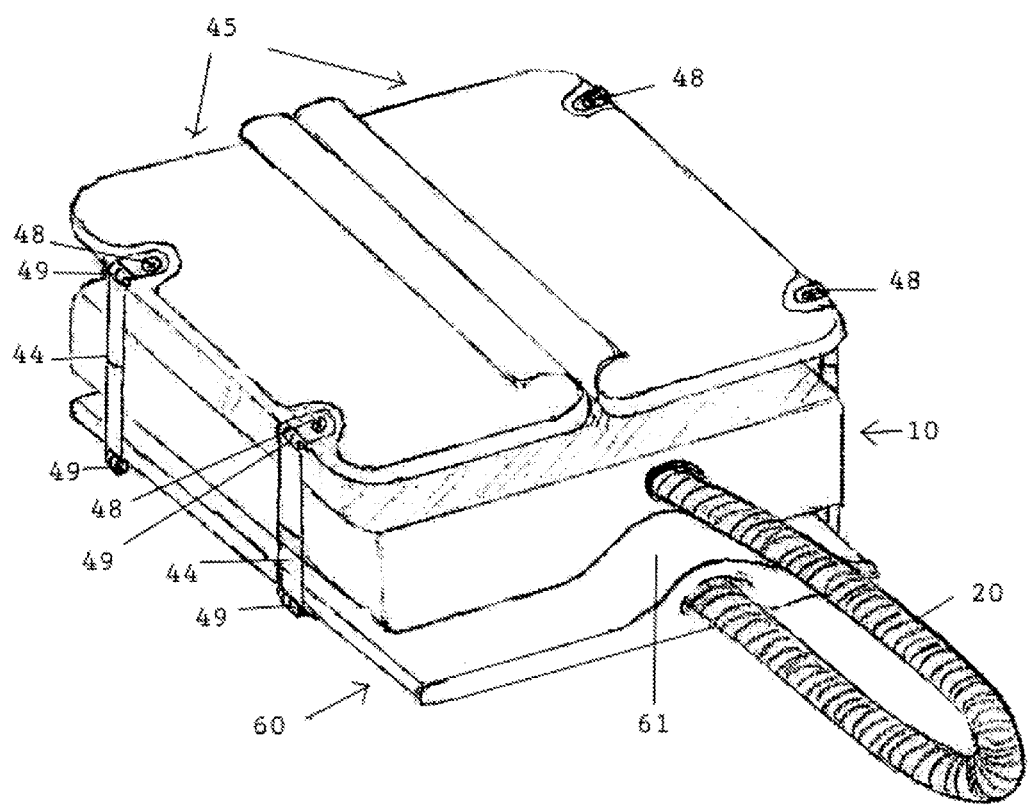
FIG. 11 is a perspective view of the personal video lighting system shown in FIGS. 9 and 10, shown in a collapsed state for storage and transport.

FIG. 11 is a front perspective view depicting the personal video lighting system of FIG. 10 in a compact folded state for transportation and storage showing the light panel 10 in close proximity to rear surface 61 of body 60, where flexible support arm 20 is folded nearly in half and serves as a carrying handle. The curved panels 45 are folded over light panel 10 by movement of extendable arms 44 about hinges 49 connected by screws 48, thereby protecting the light panel 10.

Figure 12:
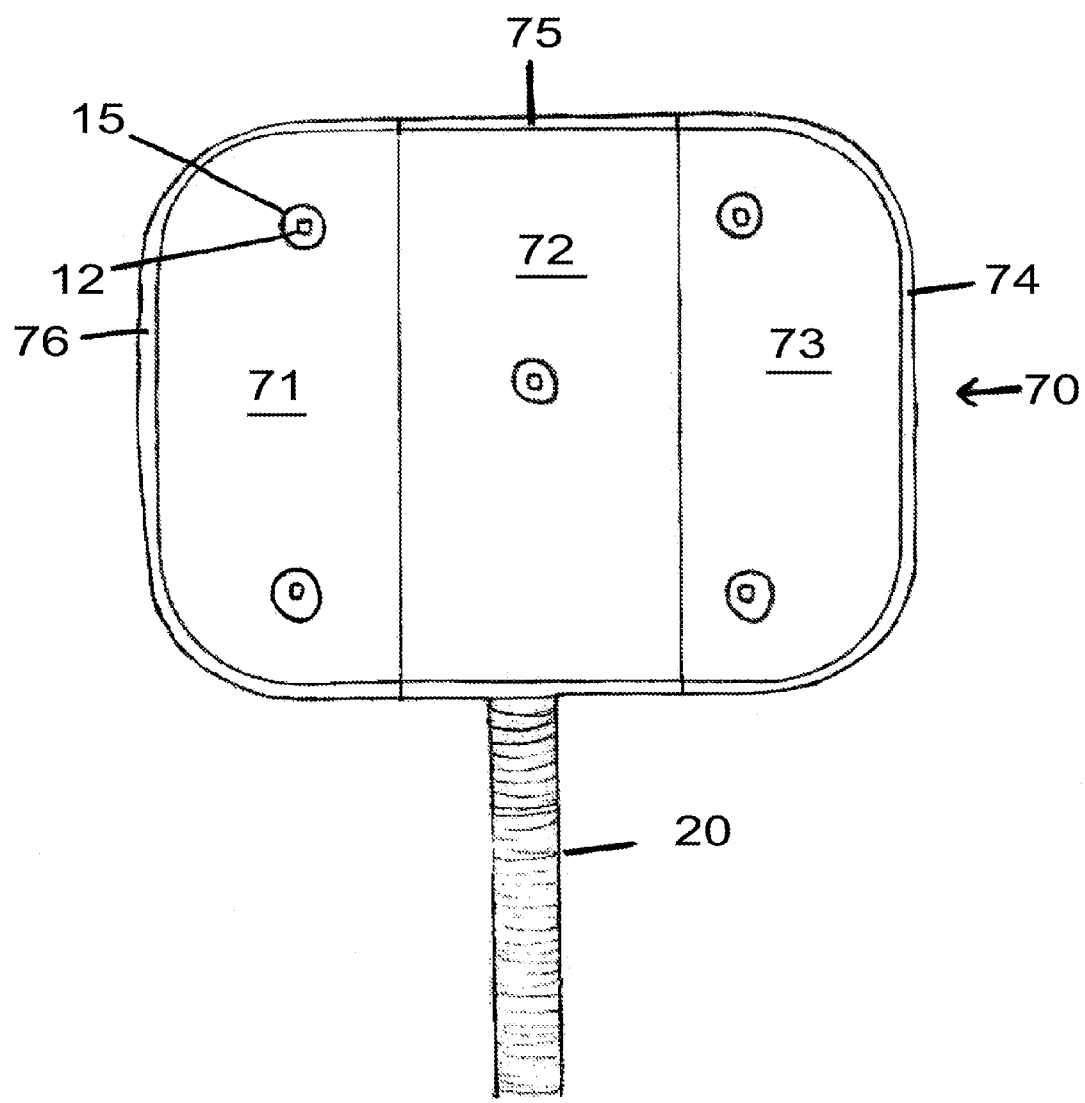
FIG. 12 is a front view of an embodiment of the light panel portion of a personal video lighting system depicting a tri-fold light panel having moveable side light panels.

FIG. 12 is a front view depicting an embodiment of the light panel portion of a personal video lighting system having a tri-fold light panel 70 attached to a flexible support arm 20. The tri-fold light panel 70 is comprised of a left panel front surface 71, a left panel rear surface 76, a center panel front surface 72, a center panel rear surface 75, a right panel front surface 73, and a right panel rear surface 74. The tri-fold light panel 70 is further comprised of a space between said front surfaces 71, 72, 73 and rear surfaces 76, 75, 74, respectively wherein said front surfaces 71, 72, 73 each have one or more receptacles 15 which contain one or more LED's 12 therein. The LED's are operably connected by wires contained within the spaces of the light panels, and are further operably connected to a dimmer circuit and means of power (not shown). In some embodiments the tri-fold light panel is operably connected by wires that pass from the tri-fold light panel through the hollow flexible support arm 20 to a means of power (not shown), such as a USB port or one or more batteries. In some embodiments the space between the center panel front surface 72 and center panel rear surface 75 contains the necessary means of power, such as batteries or a wire for connection to a USB port (not shown) and dimmer circuit. In preferred embodiments the dimmer circuit is a pulse width modulator circuit. In some embodiments one or more of the receptacles 15 may have a lens and or a diffuser covering (not shown) for modifying the light output from the LED. Now referring to FIG. 13, which shows a perspective view of a personal video lighting system having the tri-fold light panel shown in FIG. 12, wherein a pair of hinges 78 allows the left and right panels to fold over the center panel in the stored position, and also allow for user adjustment of the angle of incidence of the light irradiating from the individual panels. The hinges 78 also contain a passage for wires and the wires connecting the LED's of the left and right light panels to the operable circuitry contained in the center panel space 77. As shown in this embodiment, the flexible support arm 20 is connected to a body 80, wherein body 80 further comprises a clamping means, such as a pair of opposing arms connected by a fulcrum and torsion spring as is commonly known in the art, for attaching to a computer display. In other embodiments the tri-fold light panel may be attached to other types of clamping or holding means, and furthermore to other types of support arms.

Figure 13:
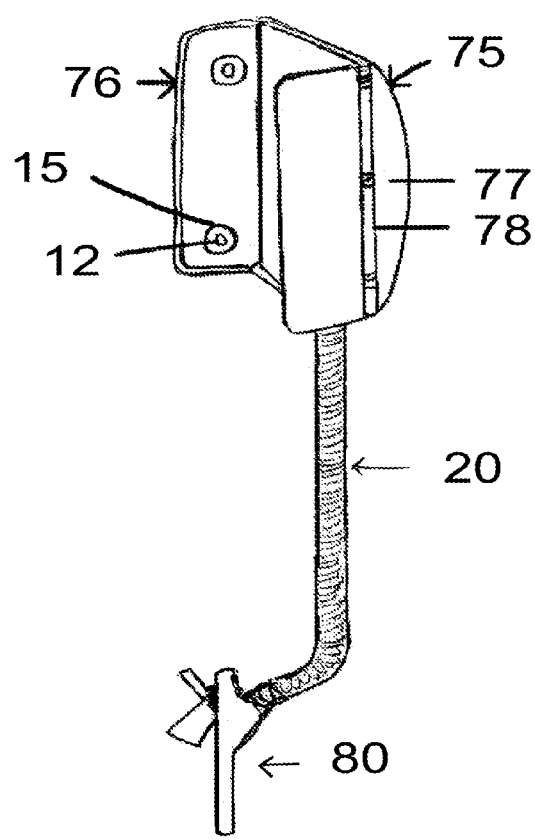
FIG. 13 is a side perspective view of an embodiment of a personal video lighting system having a tri-fold light panel having moveable side light panels.
Figure 14:
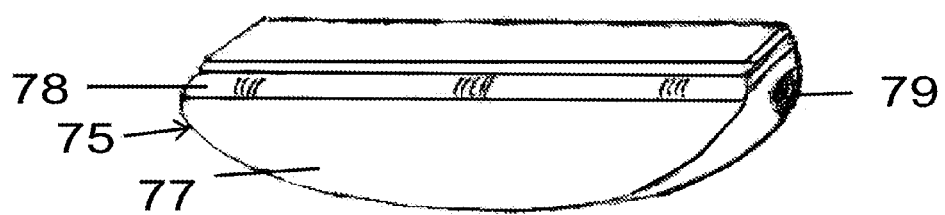
FIG. 14 is a side view of the light panel portion shown in FIGS. 12 and 13, depicting the tri-fold light panel in a compact folded state for storage and transport.

FIG. 14 shows the tri-fold light panel 70 of FIGS. 12 and 13 in a compact folded state for storage and transport. In some embodiments the center panel space 77 contains the means of power (not shown), such as one or more batteries, and the power switch and dimmer circuitry. In some embodiments there is a socket 79 from which the light panel 70 can be removably detached from the flexible support arm 20 for storage, such as for example wherein the socket 79 is a twist lock electrical connector and the flexible support arm terminates in a mating connector portion for socket 79.

FIG. 15 shows another embodiment of a personal video lighting system comprising a light panel 90 having a front surface 91, a rear surface 93, and a space defined between the front and rear surfaces, wherein the light panel 90 further comprises at least two individual holders 96 each containing one or more LED's 95. In some embodiments the individual holders 96 are printed circuit boards, which may have a metal backing, such as aluminum or copper, to provide a heat sink for the LED. The light panel 90 has an adjustment means 97 to move at least one of the holders 96 and LED's 95 contained thereon. Thus, the adjustment means 97 moves the LED closer or further away from the center of the light panel 90, thereby providing for a means for the user to adjust the spread of light output from the light panel. The adjustment means 97 may be comprised of, for example a rack and pinion gear mechanism, a wire and spool mechanism, or a slideable rod and bushing mechanism, as is commonly known in the art. The adjustment means may be controlled by a knob (not shown) located on the rear surface of the light panel 93.

FIG. 16 is a perspective view of FIG. 15, showing the space 94 containing the adjustment means 97.

Figure 17:
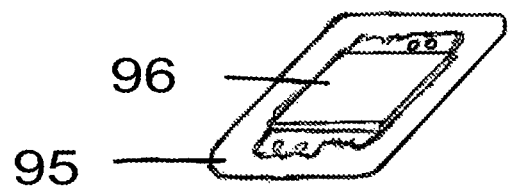
FIG. 17 is a front perspective view of a surface mount LED on a circuit board having a heat sink.

FIG. 17 shows an LED 96 mounted on a circuit board 95 having thermal management means, such as an aluminum or copper metal heat sink.

Figure 18:
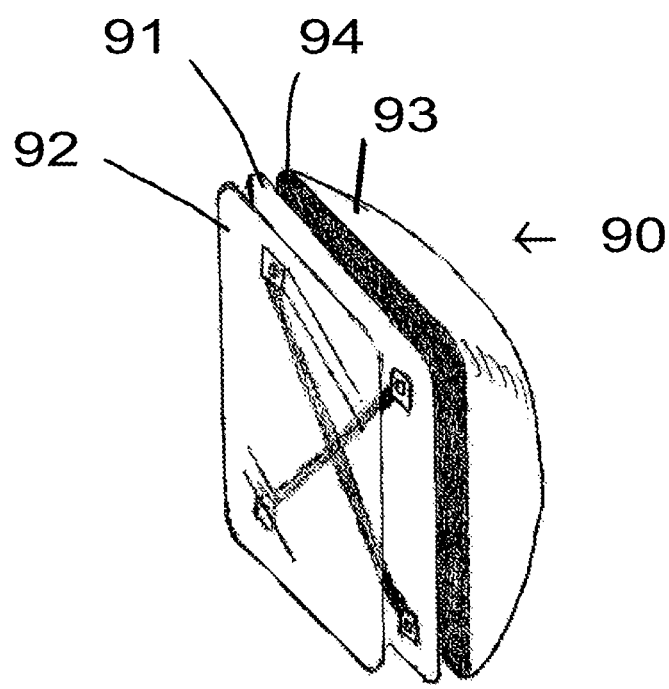
FIG. 18 is a side perspective exploded view of the light panel portion of an embodiment of a personal video lighting system having mechanically adjustable LED's and a light diffusing covering element.

FIG. 18 shows the light panel 90 of FIGS. 15 and 16 and is comprised of a rear surface 93, a front surface 91, and a space 94 defined between the rear surface 93 and the front surface 91, wherein said space 94 contains the wires and power connection (not shown) necessary for operability. In some embodiments the space 94 contains a means of power, such as one or more batteries (not shown). In some embodiments the battery power is recharged from a USB computer connection. In some embodiments the light panel further comprises a transparent covering 92 to protect the front surface 91. In some embodiments the transparent covering 92 is translucent, and provides a diffuser function to soften and spread the light irradiating from the LED's. In some embodiments the transparent covering 92 may also contain diffracting elements, such as lenses or micro lenses, as is commonly known in the art of plastic optics molding.

Figure 19A:
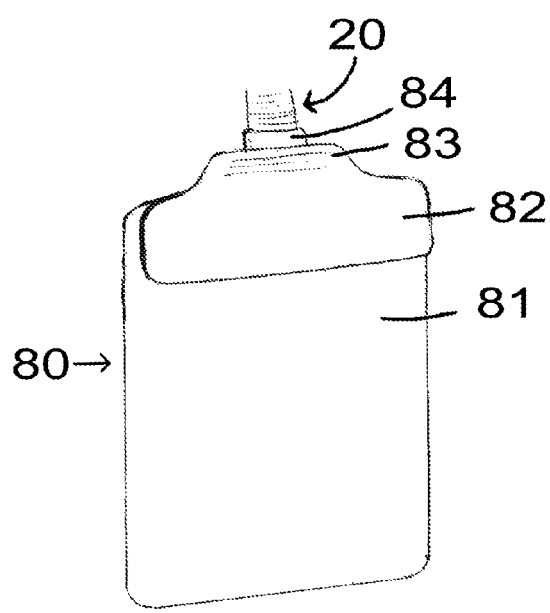
FIG. 19A is a front view of an embodiment of a body portion of a personal video lighting system having a clamping means.

FIG. 19A shows a front view of another embodiment of a portion of a personal video lighting system having a body 80 comprising a clamping means, wherein said clamping means is comprised of a back panel 81 and front panel 82, wherein the back panel 81 is longer in length than the front panel 82, and both front and back panels are operably connected by a common fulcrum hinge and a torsion spring (not shown), as is commonly known in the art. The back panel 81 has a receptacle 84 for connecting a flexible support arm 20. The back panel 81 is adapted to rest against the rear surface of a computer display, such as a laptop display monitor, and has sufficient mass to stabilize the mass of any articles, such as a light panel, attached to the receptacle 84 and flexible support arm 20. In some embodiments the back panel 81 has an additional counterweight (not shown) added to achieve additional mass for stability. The front panel 82 has a clamp handle portion 83 which is on the opposing side of the fulcrum and engages the torsion spring.

Figure 19B:
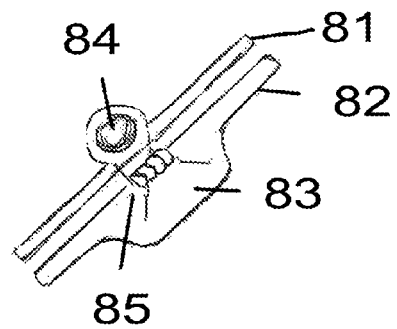
FIG. 19B is a top view of FIG. 19A.

FIG. 19B is a top view of FIG. 19A, and depicts the torsion spring 85.

Figure 20:
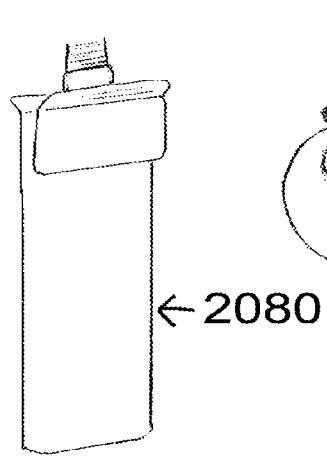
FIG. 20 is a front perspective view of an alternative embodiment of a body portion of a personal video lighting system.

FIG. 20 shows an alternate design embodiment of the clamping mechanism back panel 2080 having a larger aspect ratio rectangular shape than that shown in FIG. 19A.

Figure 21:
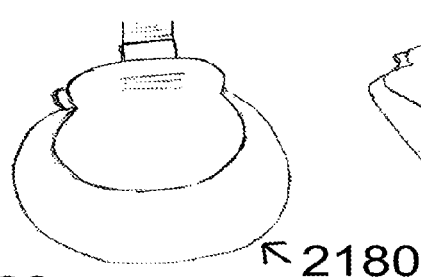
FIG. 21 is a front perspective view of an alternative embodiment of a body portion of a personal video lighting system.

FIG. 21 shows an alternate design embodiment of the clamping mechanism back panel 2180 having a round shape.

Figure 22:
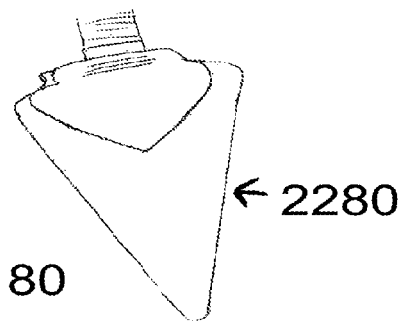
FIG. 22 is a front perspective view of an alternative embodiment of a body portion of a personal video lighting system.

FIG. 22 shows an alternate design embodiment of the clamping mechanism back panel 2280 having a triangular shape.

Figure 23A:
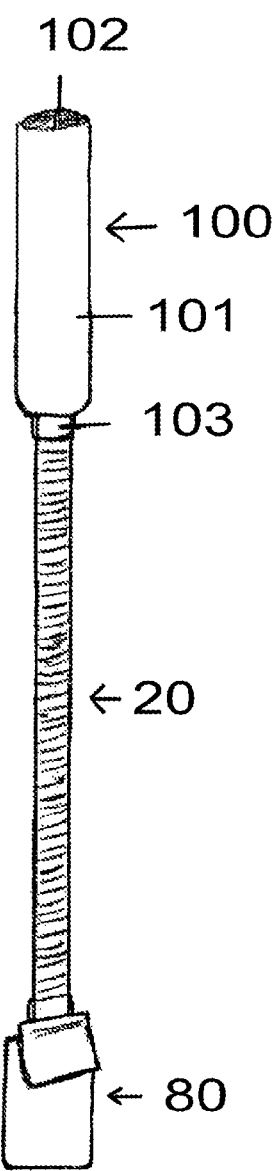
FIG. 23A is a front view of an embodiment of a personal video lighting system having multiple LED's on multiple flexible support arms contained within a slideable housing.

Now referring to FIG. 23A, which is a front view of another embodiment of a personal video lighting system 100 having a slideable housing 101. The slideable housing 101 has a proximal end 102 and a distal end 103. The slideable housing 101 is connected to a body 80 by a flexible support arm 20. In some embodiments the flexible support arm 20 is hollow. In some embodiments the flexible support arm 20 has a passage for wires (not shown) to exit the flexible support arm 20 The slideable housing 101 has a distal end 103 that is suitably sized to engage and slide over the flexible support arm 20. The outside diameter of the end of the flexible support arm 20 is adapted to engage the distal end 103 of the slideable housing 101.

Figure 23B:
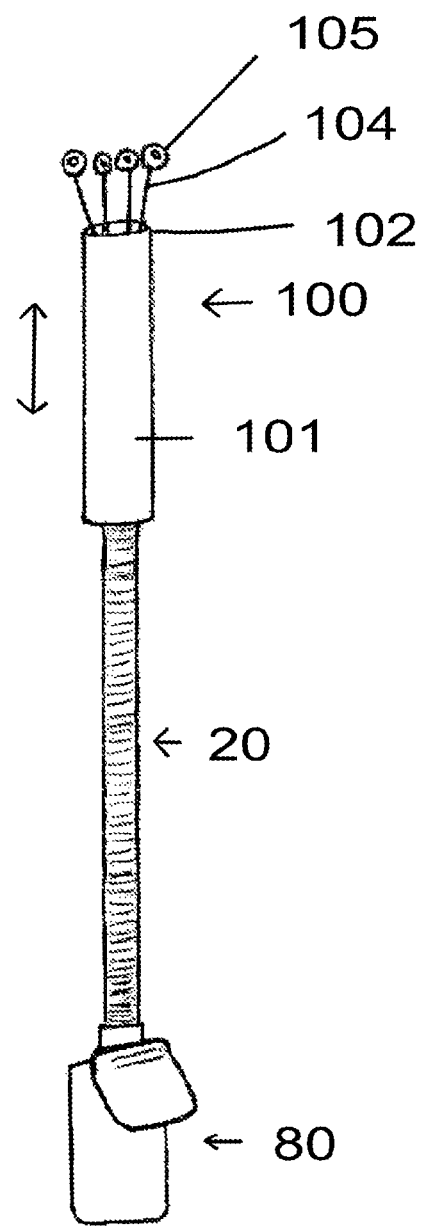
FIG. 23B is a front view of FIG. 23A depicting partial exposure of the multiple LED's by showing partial movement of the slideable housing.

FIG. 23B depicts the personal video lighting system 100 shown in FIG. 23A, having multiple LED assemblies 105 mounted on individual flexible hollow support tubes 104. The slideable housing 101 shown in FIG. 23B is partially moved distally towards the body 80, as indicated by the arrows, and the multiple LED assemblies 105 are partially exposed due to the partial movement of the slideable housing 101. The body 80 is adapted with a clamping means as is commonly known in the art to attach to a computer display monitor, and said body 80 further contains a means for power (not shown) operably connected by wires (not shown) to the LED assemblies 105. The ends of the flexible hollow support tubes 104 opposite the individual LED assemblies 105 are connected to the end of the flexible support arm 20 near the slideable housing 101, and provide for the passage of wires from the LED assemblies 105 through the flexible support arm 20 to the means of power contained in body 80. In some embodiments the end of the flexible support arm 20 has a passage (not shown) for the wires to pass outside of the flexible support arm 20 to the body 80.

Figures 23C, 24:
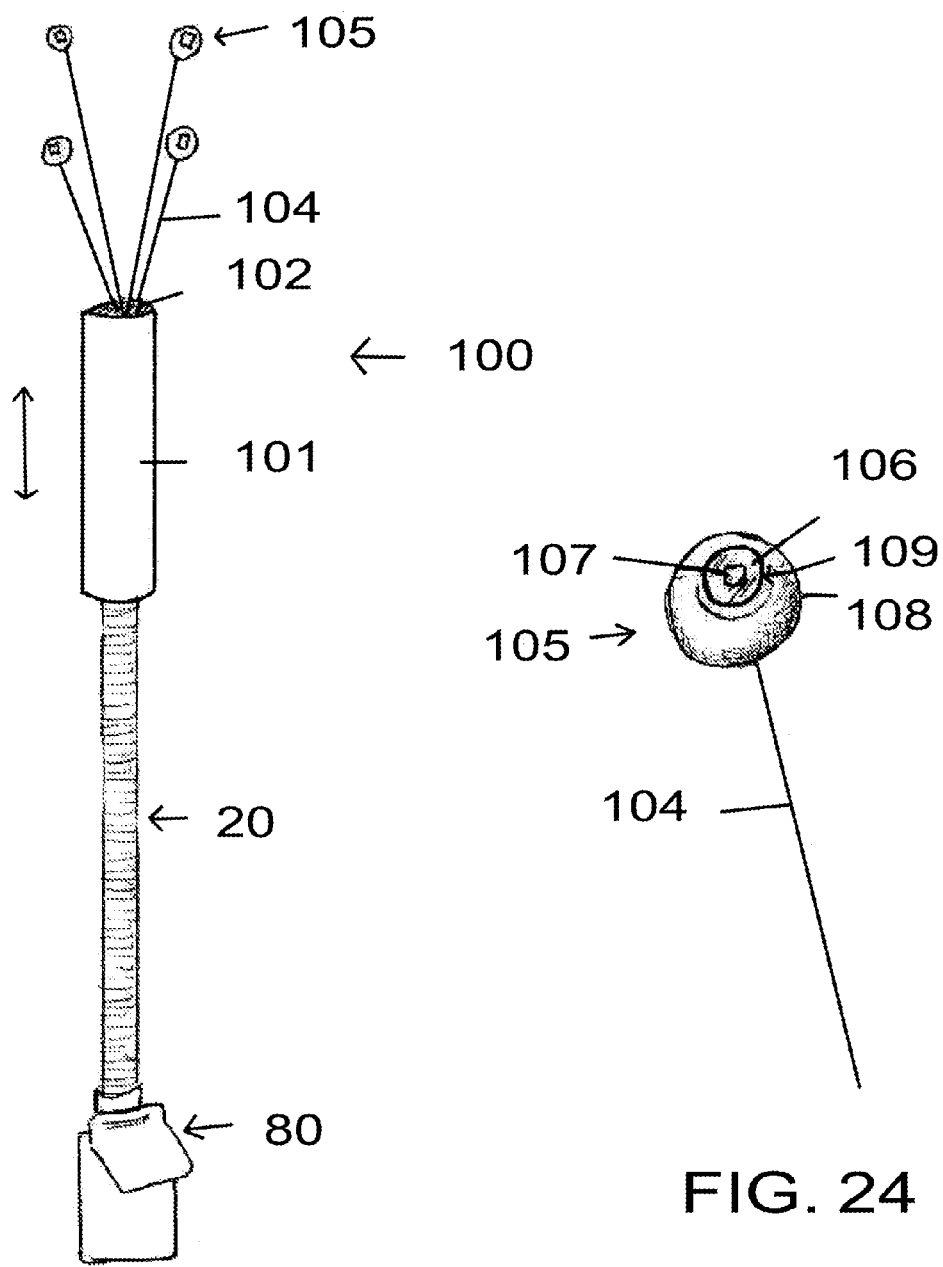
FIG. 23C is a front view of FIGS. 23A and 23B showing complete exposure of the multiple LED's by complete movement of the slideable housing.
FIG. 24 shows an LED mounted on a flexible support arm.

Now referring to FIG. 23C, the personal video lighting system 100 is shown in its use position. The slideable housing 101 is completely moved distally, which allows the LED assemblies 105 to become fully deployed. The full extension of the LED's 105 on the individual flexible hollow support tubes 104 may be enhanced by the incorporation of a spring, a guide, or a combination of one or more guides and springs (not shown) contained within the slideable housing 101 and adapted to direct and spread the individual flexible hollow support tubes 104 and LED assemblies 105 into a desired pattern and or position for use. In some embodiments the flexible hollow support tubes 104 may be comprised of a plastic coated bendable spring, such that they may be bent by the user at a desired shape and angle to spread the LED assemblies 105 apart and thus provide for desired illumination of the subject. In some embodiments the slideable housing 101 is an optional element and is not present. In some embodiments the flexible hollow support tubes 104 are comprised of thin-walled metal tubing, such as stainless steel hypodermic tubing. FIG. 24 shows a close-up perspective view of an LED assembly 105 on a flexible hollow support tube 104, comprising a holder 108 having a recessed receptacle 106 through which one or more individual LED's 107 is exposed. In some embodiments the holder 108 and receptacle 106 comprise a moveable ball and socket joint, thereby providing for adjustment of the one or more individual LED's 107 contained therein. The one or more individual LED's 107 can be an epoxy encapsulated type having a lens, or can be a surface mount type mounted on a small circuit board (not shown). The one or more individual LED's 107 has wires (not shown) that are contained within the holder 108 and flexible hollow support tube 104, and are operably connected to the means of power and control circuitry. In some embodiments the one or more individual LED's 107 is covered by a protective surface 109, which may additionally function as a lens or diffuser.

Figures 25A, 25B:
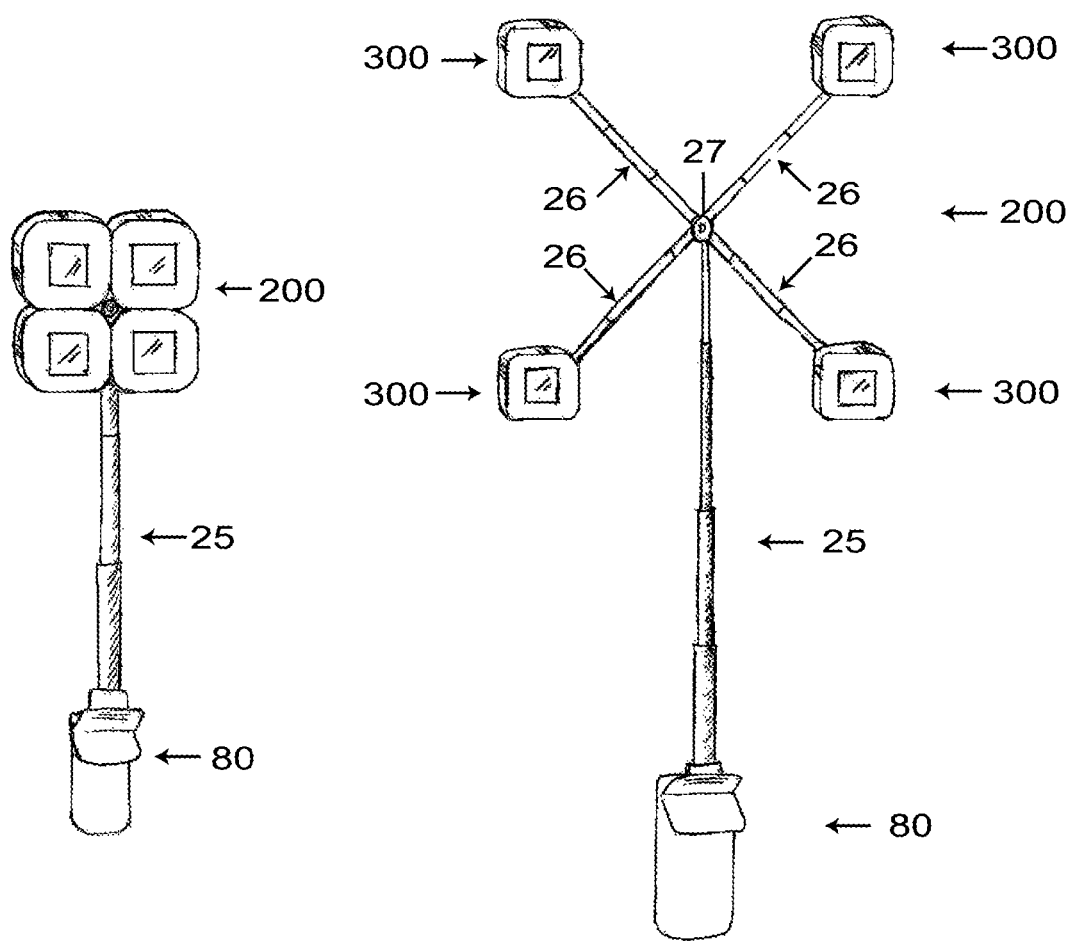
FIG. 25A is a front view of an embodiment of a personal video lighting system having multiple light panels on telescopic support arms affixed to a central telescopic extension arm, depicting the telescopic support arms in a collapsed state.
FIG. 25B is a front view of FIG. 25A showing the telescopic support arms of the multiple light panels in an extended state.
Figure 26:
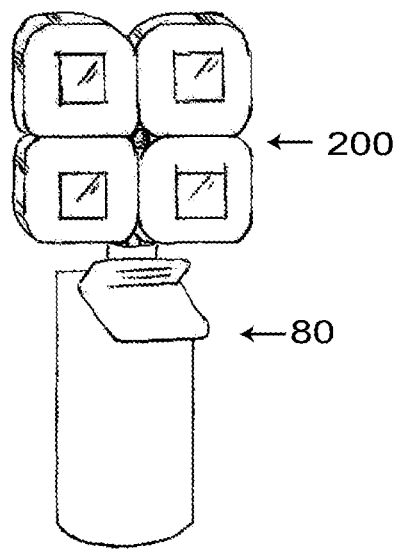
FIG. 26 is a front view of FIGS. 25A and 25B depicting the personal video lighting system in a collapsed state for storage and transport.
Figure 27:
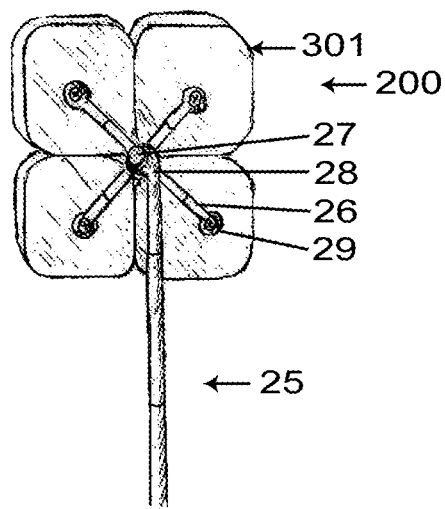
FIG. 27 is a rear view of the light panels and telescopic support arms of FIGS. 25A, 25B, and 26.

FIG. 25A shows a front view of another embodiment of a personal video lighting system comprised of an adjustable multi-panel light 200, a telescoping support arm 25 and a body 80. Still referring to FIG. 25A, the invention is shown in its use position with minimal light spread, wherein the individual light panels of the adjustable multi-panel light 200 are shown in their retracted position in close proximity to each other. Now referring to FIG. 25B, the individual light panels 300 are disposed far apart from each other to create more light spread by having their attached telescoping arms 26 extended. In some embodiments the telescoping arms 26 are connected with a ball and socket joint 27 on the telescoping support arm 25 to provide for a range of motion and adjustability, resulting in customizable lighting for a variety of conditions. FIG. 26 depicts the personal video lighting system of FIGS. 25A and 25B in the completely retracted position for storage and transport, wherein all of the telescoping arms are retracted and the multi-panel light 200 is in close proximity to the body 80. FIG. 27 is a rear view of the personal video lighting system shown in FIGS. 25A, 25B and 26 depicting the telescoping arms 26 fastened to the rear surface 301 of the individual light panels. In some embodiments the fastening is comprised of a ball and socket joint 29 to provide individual adjustment of each light panel.

Figure 28:
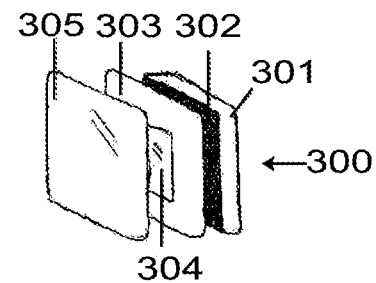
FIG. 28 is an exploded perspective view of an embodiment of a light panel portion of a personal video lighting system showing a protective covering.

Now referring to FIG. 28, the individual light panels 300 are comprised of a rear surface 301, a front surface 303, and a space between said rear and front surfaces 302, which contains wires (not shown) to connect the LED's to a means of power (not shown). An optional covering 305 protects the LED 304. In some embodiments the covering 305 provides a lens or diffusing function to the light irradiating from the LED 304. In some embodiments the LED's 304 can be a surface mount type LED that is mounted on an individual circuit board that may further have a metal heat sink; in some embodiments the LED's 304 can be an epoxy encapsulated type LED that has a lens.

Figure 29:
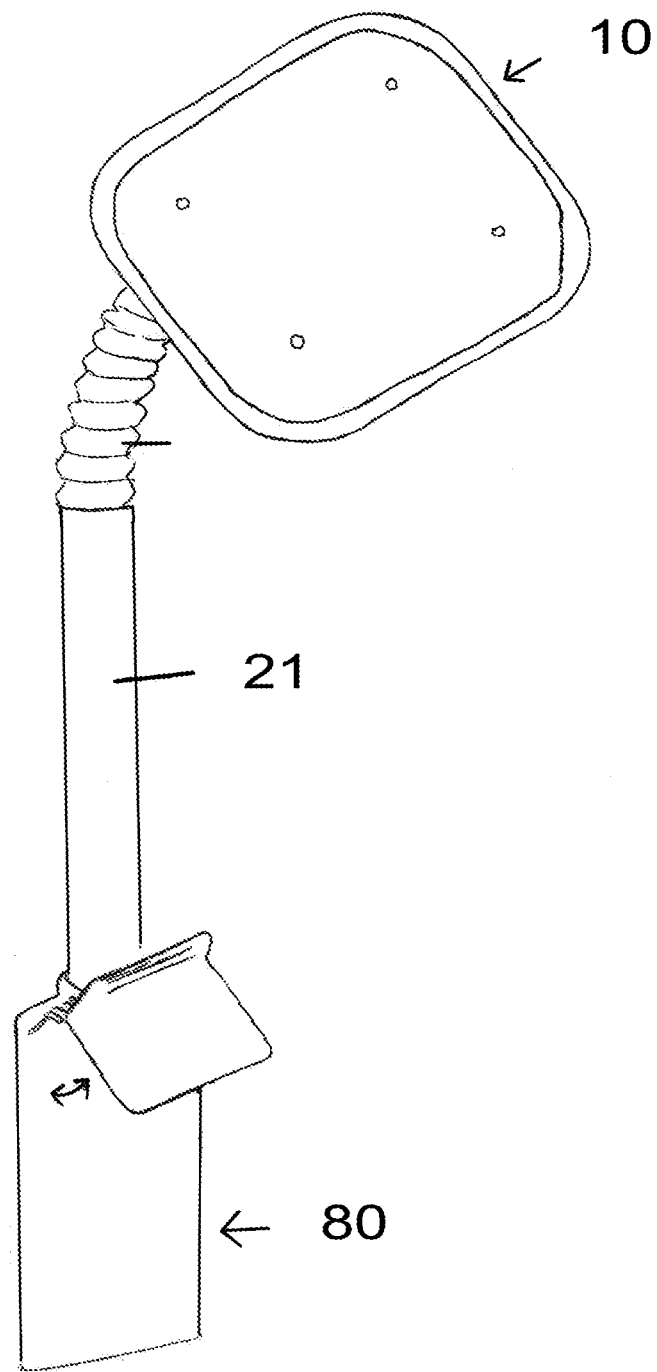
FIG. 29 is a front perspective view of an embodiment of a personal video lighting system having a flexible arm connected to a rigid arm.

FIG. 29 is a perspective view of another embodiment of a personal video lighting system having a light panel 10 that is connected to a flexible support arm 22 that is connected to a rigid neck 21, which is connected to a body 80. The body 80 further comprises a clamping means for attachment to a computer display monitor. The combination of a flexible and rigid neck allows for enhanced stability to support a heavy light panel 10, such as a light panel having one or more batteries for power contained therein.

Figure 30:
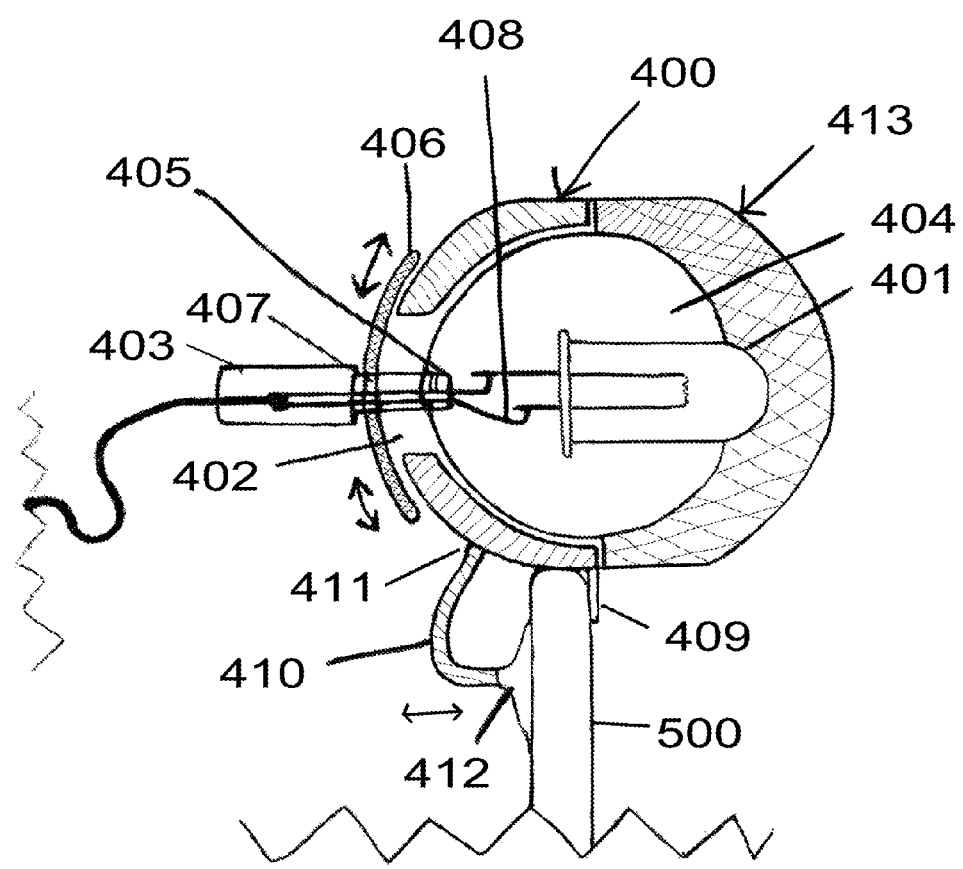
FIG. 30 is a cross sectional view of an embodiment of a light housing portion of a personal video lighting system having an adjustable ball and socket joint.

FIG. 30 is a cross sectional side view of an LED housing portion of another embodiment of a personal video lighting system, comprising a housing 400 containing an LED 401. The LED 401 is mounted in a hollow sphere 404 that is moveably contained within the housing 400, thus forming a ball and socket joint and allowing for radial motion to adjust the angle of incidence of the light irradiating from the LED 401 onto the subject. The housing 400 has an opening 402 through which a post 403 passes, wherein the opening 402 is substantially larger than post 403, and thereby allows movement of the post 403 within the opening 402, as shown by the arrows. In some embodiments the post 403 is hollow, thereby providing for the passage of wires 408. The end of the post 403 closest to the LED 401 has a smaller diameter 407 that is threaded and passes through a curved washer 406, and further is attached to the hollow sphere 404 by means of a threaded hole 405 in the hollow sphere 404, which thereby secures the hollow sphere 404 inside the housing 400. The range of motion provided for is defined by the size of the opening 402 and the size of the smaller diameter 407 of the post 403, and is preferably in the range of about 5 to about 60 degrees. In some embodiments the wires 408 pass from LED 401 through a second opening (not shown) in the hollow sphere 404 and housing 400, thereby providing for the passage of wires without the need for post 403 to be hollow.

Still referring to FIG. 30, wires 408 pass through the post 403 and operably connect the LED 401 to a means of power (not shown) and controller, such as for example one or more batteries or a USB port and a pulse width modulation circuit. The housing 400 has an extended front surface 409 adapted to engage a computer display monitor 500. The extended front surface 409 may additionally include an adhesive pad, a rubber pad, a hook and loop fastener, and the like to facilitate placement on the computer display monitor and prevent slippage and movement of the housing 400. The housing 400 further has a receptacle 411 to which one or more rear supports 410 are connected, which may optionally be further attached to a stabilizing means 412. The optional stabilizing means 412 can be, for example, a suction cup, an adhesive pad, a rubber pad, and the like, or a hook and loop fastener with a portion attached to the rear surface of the computer. The receptacle 411 can be a threaded hole, or for example, a ball and socket joint, a hinged joint, or the like to provide some movement and flexibility of the rear support 410 and thereby accommodate different thickness computer display monitors. In some embodiments the one or more the rear supports 410 can be integrally molded as part of the housing 400. The housing 400 is anchored to a computer display monitor 500 between the front and rear surfaces by the extended front surface 409 and the rear support 410. In some embodiments the housing 400 and hollow sphere 404 are further covered by a protective covering means 413. In some embodiments the protective covering means 413 additionally functions as a diffuser to soften the light irradiating from the LED. In some embodiments the protective covering means 413 additionally functions as a lens to focus the light irradiating from the LED.

Figure 31:
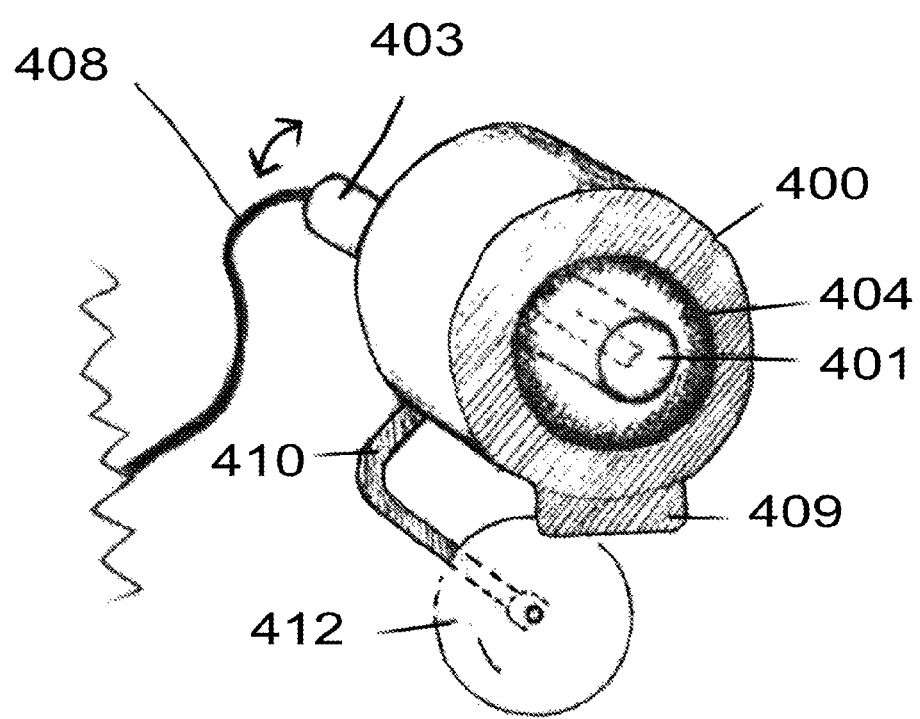
FIG. 31 is a front perspective view of an embodiment of a light housing portion of a personal video lighting system showing an LED mounted in a ball and socket joint.

FIG. 31 is a front perspective view of the LED housing portion of the personal video lighting system shown in FIG. 30, comprising a housing 400 containing an LED 401 that is attached to the hollow sphere 404. The post 403 protrudes from the rear of the hollow sphere 404 and housing 400, and provides a passage for the wires 408, and also provides a handle for the user to adjust the angle of incidence of the light produced by LED 401. The rear support 410 is connected to and protrudes from the housing 400, and is adapted to receive the stabilizing means 412.

Figure 32:
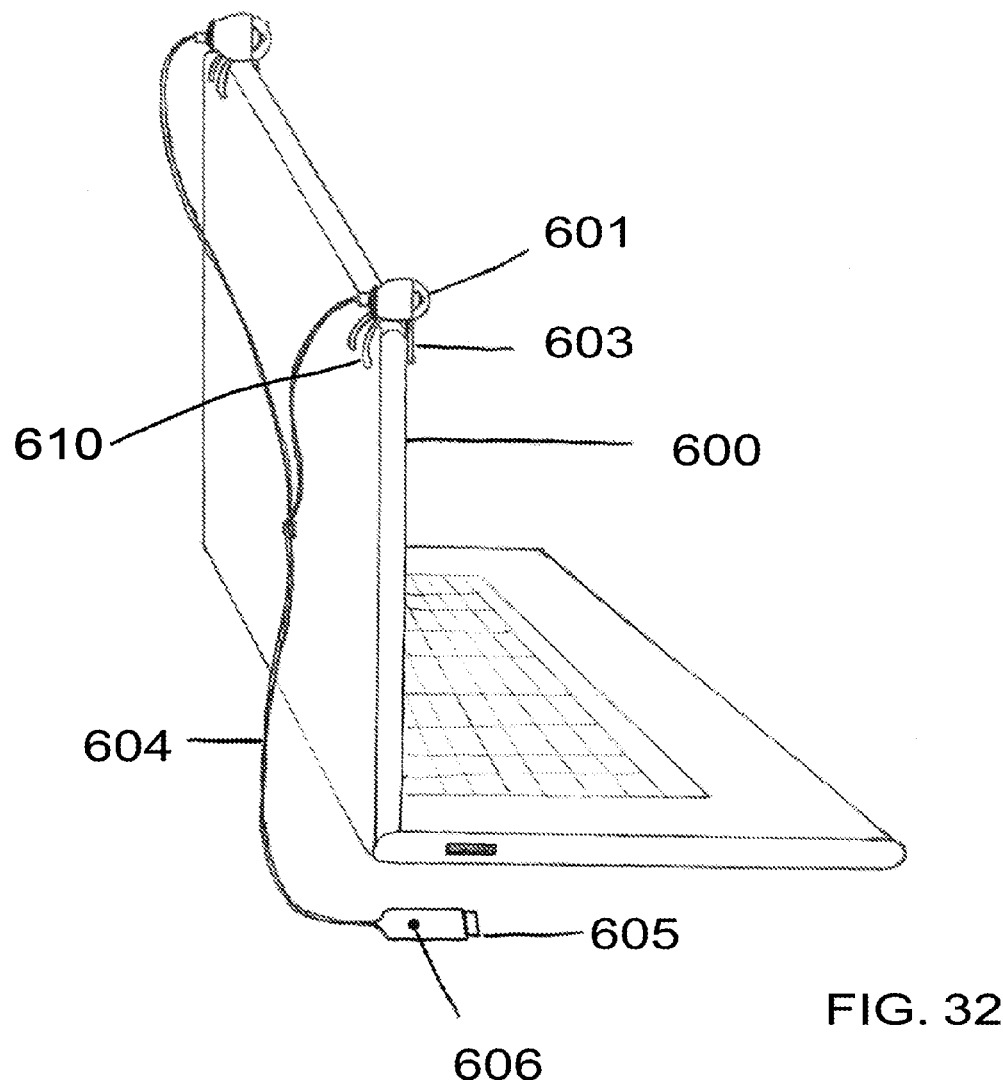
FIG. 32 is a side perspective view of a laptop computer having an embodiment of a personal video lighting system mounted thereon.

FIG. 32 is a front perspective view of an embodiment of a personal video lighting mounted on a laptop computer display. Two or more light housings 601 are attached to a computer display monitor 600. The light housings 601 have an extended front surface 603 and one or more rear support arms 610 which are adapted to attach to a computer display monitor 600. The light housings 601 are attached by wires 604 to connector 605, wherein connector 605 is adapted to connect to a means of power, and further has a pulse width modulation circuit controlled by knob 606 for adjusting the light output of light housings 601. In some embodiments connector 605 is adapted to connect to a computer USB port as a means of power. In some embodiments connector 605 is adapted to connect to a power supply (not shown), such as one or more batteries. In some embodiments the one or more batteries are rechargeable, and are connected to a computer USB port for recharging of the batteries through an appropriate circuit contained within the connector 605, such as a current limiting circuit with a diode to prevent damage to the computer.

Figure 33:
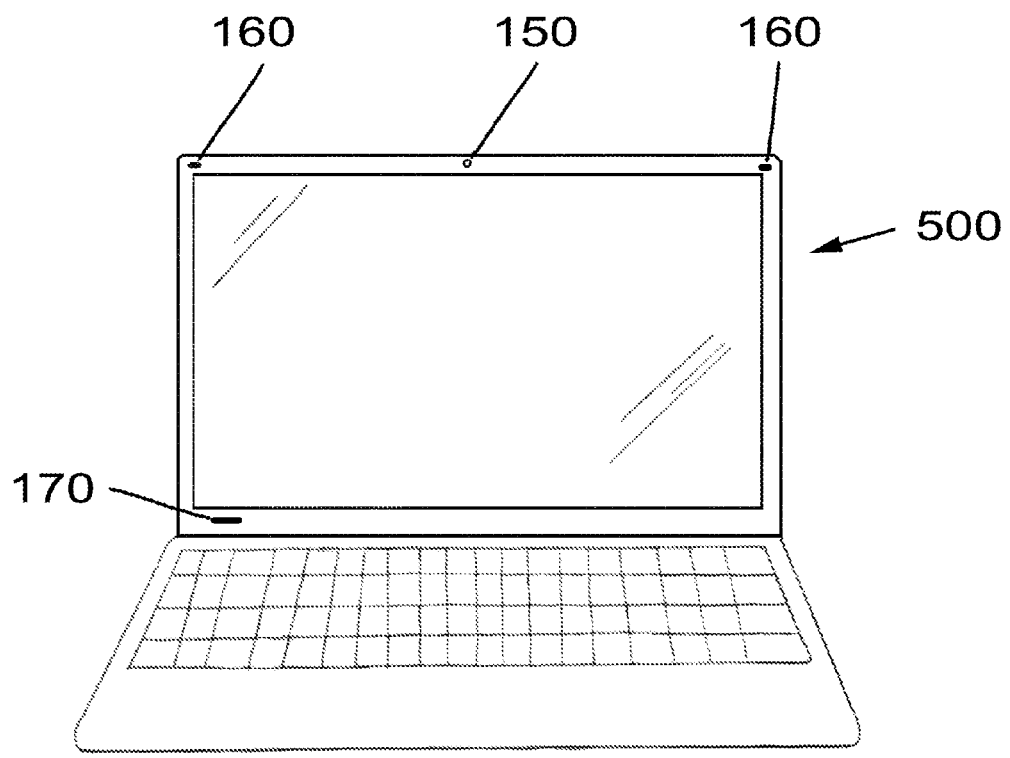
FIG. 33 is a front view of a laptop computer having an embodiment of a personal video lighting system incorporated within the computer display monitor.

FIG. 33 is a front view of an embodiment of a personal video lighting system wherein the personal video lighting system is built in to a computer display monitor, such as a laptop computer. The computer display monitor 500 contains a camera 150 for personal video communication, and further contains two or more LED's 160 disposed some distance apart. The computer contains the operative means of power and dimmer circuit for control of the output of the LED's 160, wherein the dimmer circuit is operably controlled by a knob 170 located on the computer for easy access by the user. It will be obvious to one skilled in the art that quantity and location of the two or more LED's 160 may be varied, as well as the location and style of the dimmer control knob 170, however for proper facial illumination of the user the two or more LED's 160 should be spaced two or more inches apart to provide even, balanced illumination of the user.

Figure 34A:
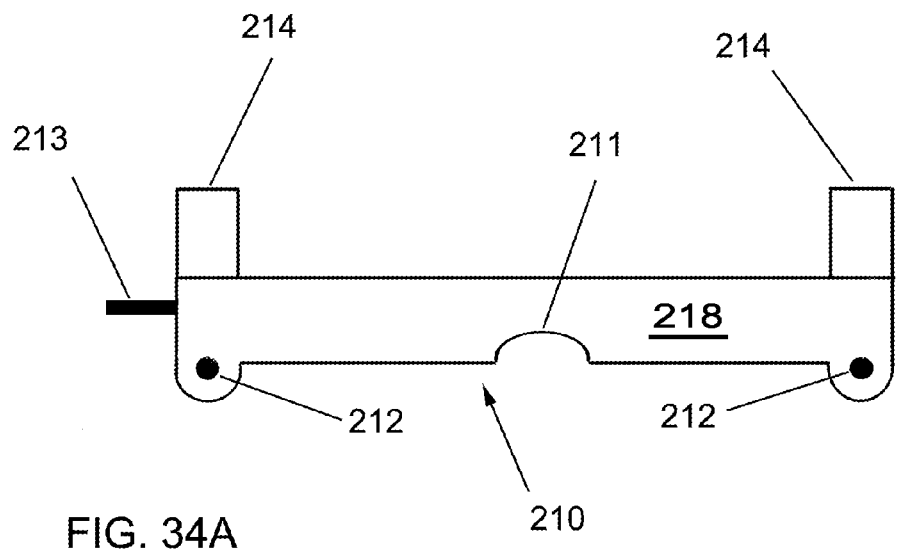
FIG. 34A is a front view of an embodiment of a personal video lighting system.

FIG. 34A is another embodiment of a personal video lighting system. The personal video lighting system comprises a body 210 adapted for mounting on the top of a computer display monitor, said body further comprising clamp handles 214. The body 210 further comprises a front surface 218 and a rear surface (not shown), and a cutout area 211 in front surface 218 for adapting to a computer camera mounted in a computer display monitor, and further comprises two or more LED's 212 disposed on the front surface 218. The LED's 212 are operably connected to a control knob 213 that is operably connected to a means of power (not shown), such as a USB port, or one or more batteries. The control knob 213 is further operably connected to a dimmer circuit contained within body 210, such that by adjusting the control knob the output of light from the LED's 212 is adjusted by the user.

Figure 34B:
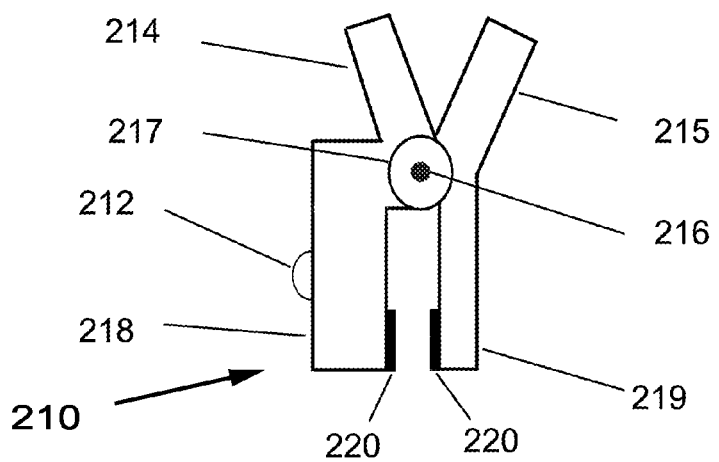
FIG. 34B is a side view of the personal video lighting system shown in FIG. 34A.

FIG. 34B is a side view of the personal video lighting system of FIG. 34A. The body 210 comprises two or more LED's 212 mounted on the front surface 218 of the body 210. A clamping means is comprised of the body 210, the clamp handles 214, an opposing clamp handle 215, a fulcrum 216, a torsion spring 217, and a rear clamping surface 219, thus comprising a clamping means for attaching the body 210 to the computer display monitor. Some embodiments may optionally include pads 220 which are adapted to grip the computer display monitor and prevent slippage of the body 210, as well as prevent damage to the computer display monitor.

Figure 35:
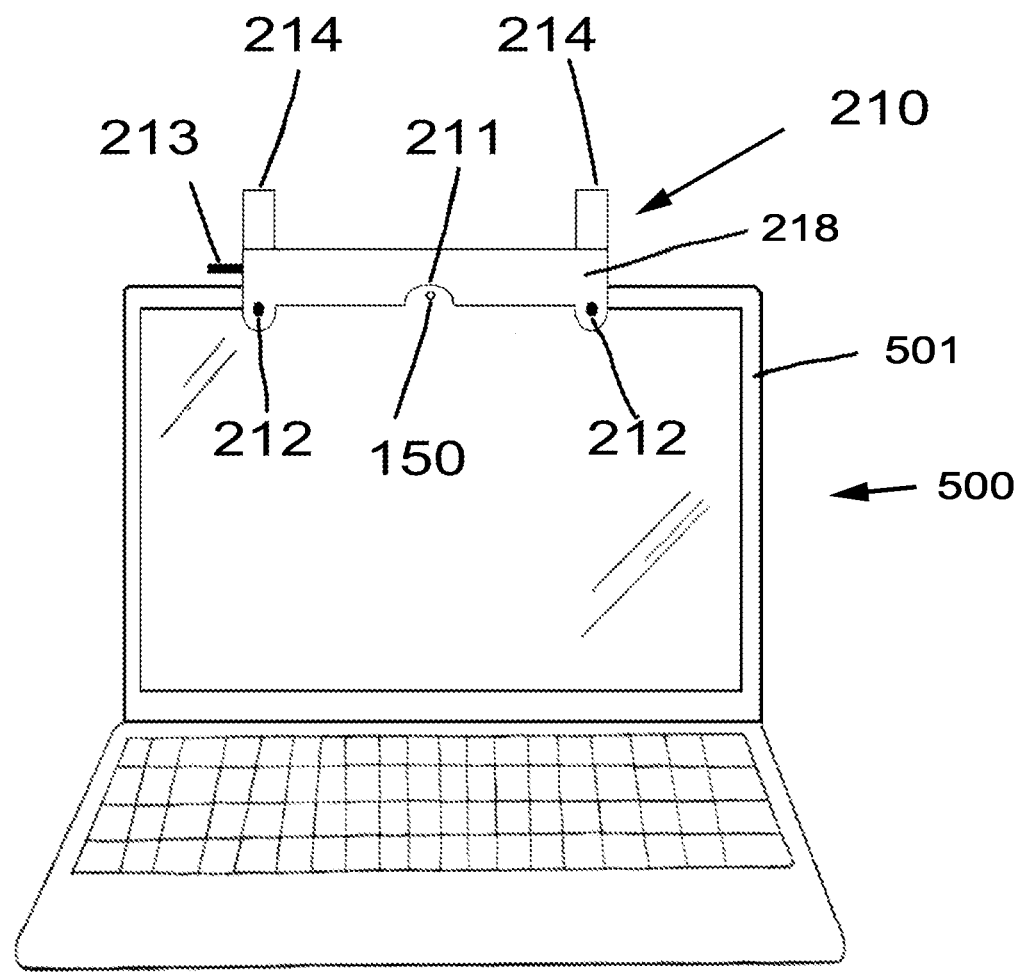
FIG. 35 is a front view showing the personal video lighting system of FIGS. 34A,B mounted on a laptop computer.

FIG. 35 is a front view of a laptop computer display monitor having a personal video lighting system attached thereto. The laptop computer display monitor 500 typically has a frame 501 surrounding the viewing area, with the frame 501 further comprising a camera 150 disposed therein. In some embodiments the camera 150 is a separate accessory attached onto the frame 501, rather than built in to the frame 501. The body 210 of the personal video lighting system has a cutout area 211 in the front surface 218 of the body 210, which is adapted to allow the camera access to capture images from the computer user. Two or more LED's 212 are disposed on the front surface 218 of the body 210, and are operably connected to a dimmer circuit and means of power (not shown) controlled by control knob 213 disposed on the body 210. The dimmer circuit may be comprised of a pulse width modulation (PWM) circuit, such as a Zetex ZXLD1321, ZXLD1350, ZXLD1361, ZXSC310, ZXSC310, ZXSC381, or Texas Instruments TLC5916 or TLC5917 circuit chip, for example, and may be contained within the body 210. In some embodiments the dimmer circuit may be located is a separate free standing body (not shown) and located in proximity to the computer display and be operably connected to the LED's 212, control knob 213, and means of power (not shown) by wires. In some embodiments the means of power is a USB port of the computer. In some embodiments the means of power is one or more batteries, wherein the batteries are contained within the body 210. In some embodiments the batteries may be located is a separate free standing body (not shown) and located in proximity to the computer display and be operably connected t by wires o the dimmer circuit, LED's 212, control knob 213, and means of power (not shown).

Figure 36:
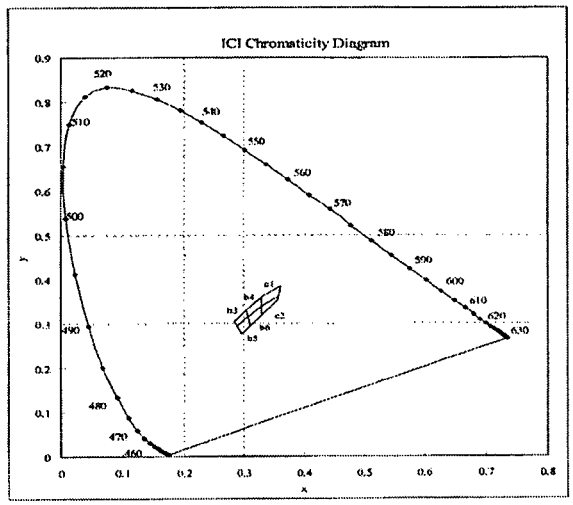
FIG. 36 shows the 1931 CIE color chromaticity diagram from the Nichia Corp. product specifications for the NS3W183T white LED, and shows the product color sorting bins according to the color chromaticity coordinates.

FIG. 36 is a CIE 1931 color chromaticity diagram showing the x and y coordinates for the Nichia NS3W183T white LED (Nichia America Corp., Wixom, Mich. 48393), and shows the product color sorting bins according to the color chromaticity coordinates. While an ideal standard for white light has x, y coordinates of 0.330, 0.330, LED light of x=0.300 and y=0.300 still yield good coloration to skin tones when used on a personal computing device. LED lights with coordinate values lower than 0.300 tend to render the skin tones of the subject in a bluish-green hue and are unattractive for the purposes of video communication. Thus, the majority of product sorted from color bins b3 and b5 would not be suitable for use in personal video lighting systems, while LED's sorted from bins c1, c2, b4, and most of b6 would be suitable for use with the present invention.

Figure 37:
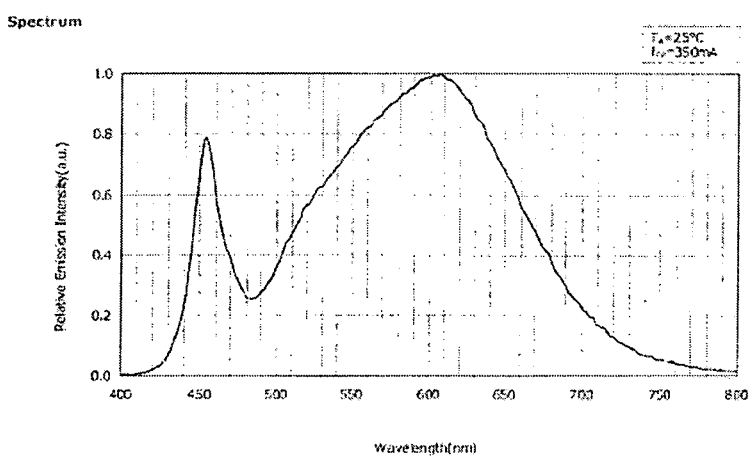
FIG. 37 shows the spectral output diagram from the Nichia Corp. product specifications for the NS3W183T white LED.

FIG. 37 is the spectral output diagram from the Nichia Corp. product specifications for the NS3W183T white LED (Nichia America Corp., Wixom, Mich. 48393). The spectral curve is typical of many phosphor-coated blue LED's currently available and is meant for illustration purposes only. The sharp peak near 450 nm is typical of blue LED's, and the larger broad peak centered around 600 nm is due to the phosphor coating. Balancing the combination of the two to produce a white light having the desired color chromaticity coordinates is a difficult task, and the yield form each batch of LED's produced is typically be sorted for the color output to reduce the variation to suit particular needs. In many low quality LED's currently available the blue LED overpowers the phosphor coating, yielding a bluish-colored LED that has CIE 1931 color chromaticity coordinates well below x=0.300 and y=0.300, and are poorly suited for personal video lighting systems of the present invention.

FIG. 37 is a block diagram of the Texas Instruments TLC5916 PWM LED driver chip (Texas Instruments, Dallas, Tex. 75265).

Figure 38:
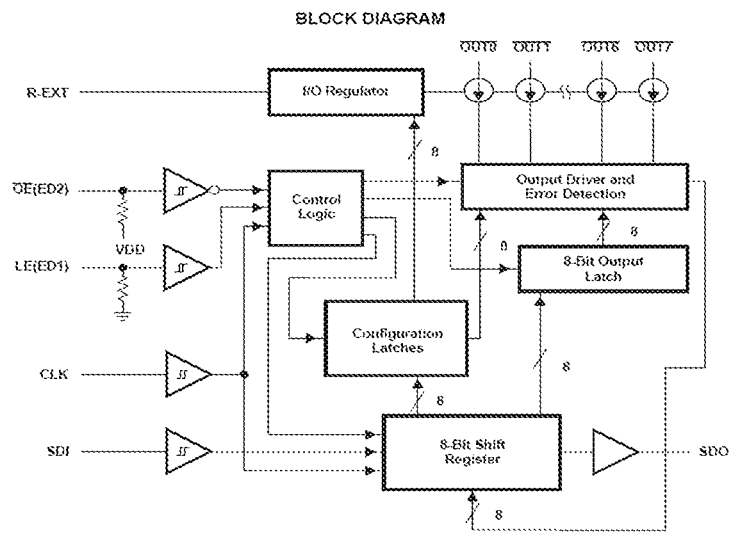
FIG. 38 shows the block diagram of the Texas Instruments LED driver circuit for the TLC5916 chip used with a TLC555 timer control chip.
Figure 39:
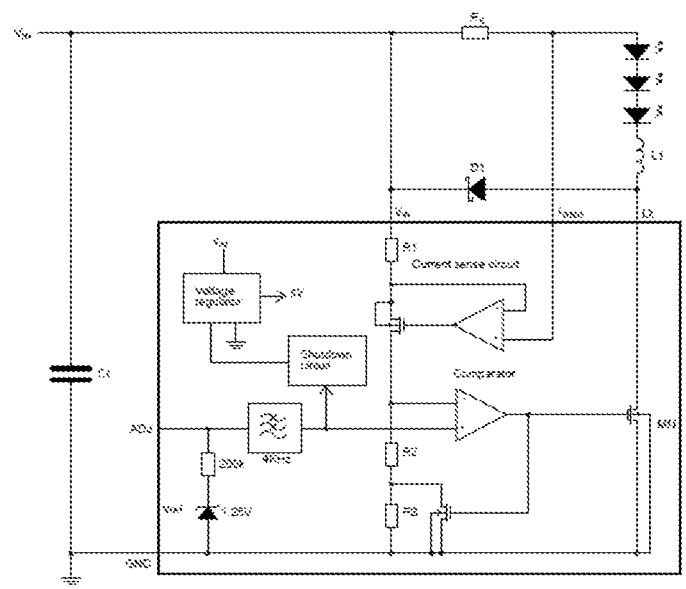
FIG. 39 shows the block diagram of the Zetex LED driver circuit for the ZXLD1350 chip. Skilled artisans will appreciate that elements in the figures are illustrated for simplicity and clarity and have not been necessarily drawn to scale. For example, the dimensions of some of the elements in the figures may be exaggerated relative to other elements to help improve the understanding of embodiments of the present invention. It will also be appreciated that these figures and drawings are supplied for illustration purposes only and may easily be modified by one skilled in the art, and that the limits and scope of the invention are bounded solely by the claims.

FIG. 38 is a block diagram of the Zetex ZXLD1350 LED driver chip (Zetex, Inc. Hauppauge, N.Y.).

EXAMPLES

A series of experiments were conducted to compare and characterize prior art LED light sources and various embodiments of LED light sources and configurations of light panels of the present invention, examining the quality of facial images obtained therefrom. In each of the following examples, unless noted otherwise, a constant ambient light level was maintained with one General Electric Soft White 60 watt bulb in a 5 foot tall floor lamp (without a lamp shade) placed 7 feet away to the left of the subject. The subject is seated at a desk having a working surface height 31 inches from the floor. An NEC model 1770NXM 17-inch LCD computer display monitor is placed on the desk surface and connected to a computer, and a Logitech Webcam Pro 9000 auto-focus 2 megapixel camera is placed on the top surface of the computer display monitor at a height of 18 inches from the desk surface. The subject's eyes are 17 inches above the desk surface and 24 inches from the camera, and the light source under test is placed 8 inches above the camera and angled down towards the subject's eyes and face. Some of the individual light sources were measured for CIE 1931 color chromaticity coordinates in a diode array detector using Illuminant A for the CIE color data.

Example 1

A General Electric Soft White 60 watt bulb in a 5 foot tall floor lamp (without a lamp shade) standing 7 feet away from the subject is the sole source of illumination aside from any light provided by the computer display monitor itself. The subject's face and eyes are unevenly and poorly illuminated, casting unappealing shadows and contrast.

Example 2

A Sylvania "Dot-It" model dimmable LED surface light having 3 LED's was placed in the test setup in front of the subject. The dimmable function of the light obtains varying degrees of illumination by turning on one, two, or all three LED's. The light has an undesirable bluish-green tone and has CIE 1931 chromaticity coordinates of x=0.2795 y=0.2834 as measured on a diode array detector. The Sylvania "Dot-It" model dimmable LED poorly illuminates the subject's face, even when fully powered at the brightest setting.

Example 3

A Satco "The Flip"™ model LED desk light having 11 LED's was placed in the test setup in front of the subject. The illumination is too bright and washes out the facial features and fine details of the subject's face and clothing.

Example 4

A Rite-Lite™ model LPL700 wireless LED under cabinet light having 12 LED's was placed in the test setup in front of the subject. The illumination is uneven and too bright in areas, washing out the facial features and fine details of the subject's face.

Example 5

A 4 by 5 inch array light panel was fabricated on ¼" thick foam core board and populated with 5 evenly spaced Nichia NS3L183T-H3 type SW40B09M LED lamps (Nichia America Corp., Wixom, Mich. 48393), one at each corner of the array and one in the center. The LED's were wired in series and powered by a DC power supply by varying the output voltage. The voltage was adjusted in increments of 0.25 volts between 13.00 and 14.00 volts. The images obtained at 13.25 and 13.50 volts, respectively, provide optimal illumination and proper color balance for the appearance of the skin tones of the subject. Lower and higher voltages result in lower and higher illumination levels, but the color balance and skin tone is still maintained. An individual Nichia NS3L183T-H3 type SW40B09M LED lamp was tested for chromaticity in a diode array detector and found to have the following CIE 1931 chromaticity coordinates: at 2.60 volts x=0.3878 y=0.3795; at 2.70 volts x=0.3873 y=0.3789; and at 2.80 volts x=0.3838 y=0.3752. The manufacturer's product specification color coordinates are provided in FIG. 36.

Example 6

A 7"×9" light panel was fabricated on ¼" thick foam core board and populated with a 4 by 4 array of 16 Nichia NSPW310 type COW LED lamps (Nichia America Corp., Wixom, Mich. 48393) spaced at 3 inches apart horizontally and 2.5 inches apart vertically. The lamps were wired in parallel and powered by a DC power supply between 2.6 and 2.8 volts. In addition, the use of reflectors were used and compared with the lamps powered at a constant 2.70 volts. The use of 2.60 volts provides soft, even, but relatively low illumination. The use of 2.70 volts provides proper illumination. The use of 2.80 volts provides slightly excessive illumination, wherein some of the details of the forehead are starting to be washed out. The use of additional reflector materials provides for some additional illumination and reduction of shadows. An individual Nichia NSPW510 type COW LED lamp (5 mm version of the –310 lamp) was tested for chromaticity in a diode array detector and found to have the following CIE 1931 chromaticity coordinates: at 2.60 volts x=0.3321 y=0.3496; at 2.70 volts x=0.3308 y=0.3450; and at 2.80 volts x=0.3302 y=0.3423.

Example 7

A 10" diameter ring was fabricated on ¼" thick foam core board and populated with 12 evenly spaced Nichia NSPW500DS type COW LED lamps (Nichia America Corp., Wixom, Mich. 48393). Although the illumination level was sufficient, it was not as soft and even as the 7"×9" panel of example 6.

Example 8

A 6" diameter ring was fabricated on ¼" thick foam core board and populated with 10 evenly spaced Nichia NSPW500DS type COW LED lamps (Nichia America Corp., Wixom, Mich. 48393), similar to example 7. The light was too bright compared to the 7"×9" panel of example 6 and washed out the facial features of the subject.

Example 9

An 8"×10" light panel was fabricated on ¼" thick foam core board and populated with 5 Nichia NS3W183T surface mount LED lamps (Nichia America Corp., Wixom, Mich. 48393), placed 1 inch from each corner and one in the center. The light was almost identical in quality and spread to the 7"×9" panel of example 6.

Example 10

A 5"×7" panel was fabricated and populated with 5 Nichia NS3W183T-H3 type C11B11M surface mount LED lamps placed 1 inch from each corner and one LED lamp in the center. The light was almost identical in quality and spread to the 7"×9" panel of example 6.

Example 11

A 3"×5" panel was fabricated on ¼" thick foam core board and populated with 4 Nichia NS3W183T-H3 type C11B11M surface mount LED lamps (Nichia America Corp., Wixom, Mich. 48393) placed 1 inch from each corner. The light was almost identical in quality and spread to the 7"×9" panel of example 6.

Example 12

A 3"×3" panel was fabricated on ¼" thick foam core board and populated with 4 Nichia NS3W183T-H3 type C11B11M surface mount LED's (Nichia America Corp., Wixom, Mich. 48393) placed 1 inch from each corner. The light was almost identical in quality and spread to the 7"×9" panel of example 6.

Example 13

A 9-element white LED "Miracle Beam" flashlight having a 1 inch diameter was obtained at a local hardware store and placed in the test setup. The light was very blue in color and illuminated the central facial features and eye sockets of the subject, but created harsh shadows and poorly illuminated the subject's hair.

Example 14

Without the ambient 60-watt floor lamp in place, a light panel of the present invention was tested. The light panel was fabricated on a 2¾"×6" printed circuit prepunched board (RadioShack #276-1395, RadioShack Corp., Fort Worth, Tex. 76102) and populated with 6 Nichia NS5L157RT-H3 type SW45-P6 surface mount LED's (Nichia America Corp., Wixom, Mich. 48393) spaced evenly about the long edges of the board. The LED's were driven by a Texas Instruments TLC5916 LED driver chip (Texas Instruments, Dallas, Tex. 75265) and controlled by a Texas Instruments TLC555 timer chip and powered by a single 9 volt battery. The intensity was controlled by 10 k ohm potentiometer used as R-ext in the circuit (see FIG. 34), and the system provided for even, controllable illumination of the subject.

Example 15

Without the ambient 60-watt floor lamp in place, a light panel of the present invention was tested. The light panel was fabricated on a 2¾"×6" printed circuit prepunched board (RadioShack #276-1395, RadioShack Corp., Fort Worth, Tex. 76102) and populated with 4 Nichia NS3W183T-H3 type C11B11M surface mount LED's (Nichia America Corp., Wixom, Mich. 48393) placed at the 4 corners of the board. The LED's were driven by a Zetex ZXLD1350 LED driver chip (Zetex, Inc. Hauppauge, N.Y. 11788) and powered by a pair of 9 volt batteries in series to provide 18 volts. The current output was controlled by a 3 k ohm potentiometer used to vary the supply voltage in the circuit, and the system provided for even, controllable illumination of the subject.

Example 16

Without the ambient 60-watt floor lamp in place, a light panel of the present invention was tested. The light panel was fabricated on a 2" round printed circuit prepunched board (RadioShack Corp., Fort Worth, Tex. 76102) and populated with a single Nichia NSPW500DS type COW LED (Nichia America Corp., Wixom, Mich. 48393). The LED was driven by a Zetex ZXSC380 LED driver chip (Zetex, Inc. Hauppauge, N.Y. 11788) with a 100 uH inductor (Digikey, Inc., Thief River Falls, Minn. 56701) and powered by a 1.5 volt AAA battery. The current output was controlled by a 3 k ohm potentiometer (Digikey, Inc., Thief River Falls, Minn. 56701) used to vary the supply voltage in the circuit, and the system provided for controllable illumination of the subject with good color balance, but did not provide adequate illumination to properly illuminate the face and prevent undesired shadowing.

It is to be understood that other shapes and sizes of light panels other than those shown in the figures are contemplated for the present invention, and various types of extension means can be employed beyond that which has been illustrated in the figures. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention described in the following claims.

What is claimed is:

1. A lighting system for use with a personal computer, comprising a body, one or more light panels, two or more white LED's disposed on said one or more light panels, a flexible support arm connecting said body to said one or more light panels, a means of power, an adjustable pulse width modulation circuit operatively connecting said two or more white LED's to said means of power, wherein said two or more white LED's have a CIE 1931 color chromaticity x coordinate between 0.300 and 0.420 and a CIE 1931 color chromaticity y coordinate between 0.300 and 0.420.

2. The lighting system of claim 1, wherein said two or more white LED's have a CIE 1931 color chromaticity x coordinate between 0.330 and 0.395 and a CIE 1931 color chromaticity y coordinate between 0.330 and 0.395.

3. The lighting system of claim 1, wherein said means of power comprises a connection to a computer USB port.

4. The lighting system of claim 1, wherein said means of power comprises one or more batteries.

5. The lighting system of claim 4, wherein said batteries are rechargeable and are recharged by a connection to a USB port.

6. The lighting system of claim 1, wherein said body further comprises a clamping means for attachment to a personal computer display.

7. The lighting system of claim 6, wherein said clamping means comprises a pair of extendable arms having curved ends adapted for gripping a computer display monitor.

8. The lighting system of claim 1, wherein said one or more light panels further comprises a first center light panel, a second light panel, and a third light panel, wherein said second light panel and said third light panel are hingedly connected to said first center light panel.

9. The lighting system of claim 1, wherein said one or more light panels further comprises an adjustment means for moving at least one of said white LED's to adjust the spread of light from said light panel.

10. The lighting system of claim 1, wherein said two or more white LED's are disposed at least 2 inches apart.

11. A lighting system for use with a personal computer, comprising a body, a flexible support arm having a first end and a second end, wherein said first end of said flexible support arm is connected to said body, a plurality of hollow flexible support tubes having a first end and a second end, wherein said first end of said plurality of hollow flexible support tubes is connected to said second end of said flexible support arm, and said second end of said plurality of hollow flexible support tubes each has a housing connected thereon, wherein said housing has one or more white LED's disposed on each of said housings, a means of power, an adjustable pulse width modulation circuit operatively connecting said one or more white LED's to said means of power, wherein said one or more white LED's have a CIE 1931 color chromaticity x coordinate between 0.300 and 0.420 and a CIE 1931 color chromaticity y coordinate between 0.300 and 0.420.

12. The lighting system of claim 11, wherein said one or more white LED's have a CIE 1931 color chromaticity x coordinate between 0.330 and 0.395 and a CIE 1931 color chromaticity y coordinate between 0.330 and 0.395.

13. The lighting system of claim 11 wherein said housing comprises a ball and socket joint.

14. The lighting system of claim 11 further comprising a slideable housing adapted to engage the end of said flexible support arm and contain said plurality of hollow flexible support arms.

15. A lighting system for use with a personal computer, comprising two or more housings each having an extended front surface adapted for engaging a computer display monitor, a flexible rear support adapted for engaging a computer display monitor, wherein said housings further comprise a moveable hollow sphere having one or more white LED's disposed therein, wherein said one or more white LED's are operably connected to a pulse width modulation circuit and a means of power, wherein said one or more white LED's have a CIE 1931 color chromaticity x coordinate between 0.300 and 0.420 and a CIE 1931 color chromaticity y coordinate between 0.300 and 0.420.

16. A lighting system for use with a personal computer, comprising a body having a front surface and a rear surface, a clamping means for attachment to a computer display monitor, and two or more white LED's disposed on said front surface, wherein said two or more white LED's are operably connected to a pulse width modulation circuit and a means of power, wherein said LED's have a CIE 1931 color chromaticity x coordinate between 0.300 and 0.420 and a CIE 1931 color chromaticity y coordinate between 0.300 and 0.420.

17. The lighting system of claim 16, wherein said two or more white LED's are disposed at least two inches apart.

18. A personal computer having a personal video lighting system incorporated therein, comprising a personal computer having a display monitor, a means of power, a pulse width modulation circuit, wherein said display monitor has a frame having a front surface, two or more white LED's disposed on said front surface, wherein said LED's are operably connected to a pulse width modulation circuit, said pulse width dimmer modulation circuit being operably connected to a control knob and a means of power, wherein said LED's have a CIE 1931 color chromaticity x coordinate between 0.300 and 0.420 and a CIE 1931 color chromaticity y coordinate between 0.300 and 0.420.

19. The lighting system of claim 18, wherein said two or more white LED's have a CIE 1931 color chromaticity x coordinate between 0.330 and 0.395 and a CIE 1931 color chromaticity y coordinate between 0.330 and 0.395.

20. The lighting system of claim 18, wherein said two or more white LED's are disposed at least two inches apart.

\* \* \* \* \*